United States Patent
Kato et al.

(10) Patent No.: US 10,210,449 B2
(45) Date of Patent: *Feb. 19, 2019

(54) WIRELESS COMMUNICATION DEVICE, METHOD FOR MANUFACTURING SAME, SEAL FITTED WITH RFIC ELEMENT, AND METHOD FOR PRODUCING SAME

(71) Applicant: Murata Manufacturing Co., Ltd., Nagaokakyo-shi, Kyoto-fu (JP)

(72) Inventors: Noboru Kato, Nagaokakyo (JP); Kunihiro Komaki, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/790,095

(22) Filed: Oct. 23, 2017

(65) Prior Publication Data

US 2018/0060717 A1 Mar. 1, 2018

Related U.S. Application Data

(63) Continuation of application No. 15/234,304, filed on Aug. 11, 2016, now Pat. No. 9,836,686, which is a
(Continued)

(30) Foreign Application Priority Data

Nov. 7, 2014 (JP) .................................. 2014-227195
Mar. 6, 2015 (JP) .................................. 2015-044178

(51) Int. Cl.
G06K 19/06 (2006.01)
G06K 19/077 (2006.01)
G06K 19/07 (2006.01)

(52) U.S. Cl.
CPC ....... *G06K 19/07722* (2013.01); *G06K 19/07* (2013.01); *G06K 19/077* (2013.01); *G06K 19/07728* (2013.01)

(58) Field of Classification Search
CPC ............ G06K 19/07749; G07F 7/1008; G06Q 20/341
(Continued)

(56) References Cited

U.S. PATENT DOCUMENTS 9,836,686 B2 * 12/2017 Kato ................ G06K 19/07722
2009/0033467 A1 2/2009 Finocchiaro et al.
2013/0200162 A1 8/2013 Dokai et al.

FOREIGN PATENT DOCUMENTS

CN 103299325 A 9/2013

OTHER PUBLICATIONS

Kato et al., "Wireless Communication Device, Method for Manufacturing Same, Seal Fitted With RFIC Element, and Method for Producing Same", U.S. Appl. No. 15/234,304, filed Aug. 11, 2016.

* cited by examiner

*Primary Examiner* — Ahshik Kim
(74) *Attorney, Agent, or Firm* — Keating & Bennett, LLP

(57) ABSTRACT

In a wireless communication device, radiation conductors including a first and second end portions are reformed on an upper surface of a radiation conductor base material. First and second terminal electrodes are provided at a same or substantially the same interval as the first and second end portions, on a lower surface of a RFIC element. A seal includes an adhesive surface larger than a principal surface of the RFIC element. The RFIC element is arranged on the upper surface of the radiation conductor substrate so that each of the first and second terminal electrodes comes into contact with the first and second end portions. The seal is
(Continued)

pasted to the radiation conductor substrate so as to cover the RFIC element.

20 Claims, 19 Drawing Sheets

Related U.S. Application Data continuation of application No. PCT/JP2015/080449, filed on Oct. 28, 2015.

(58) Field of Classification Search
USPC .................................................. 235/492, 488
See application file for complete search history.

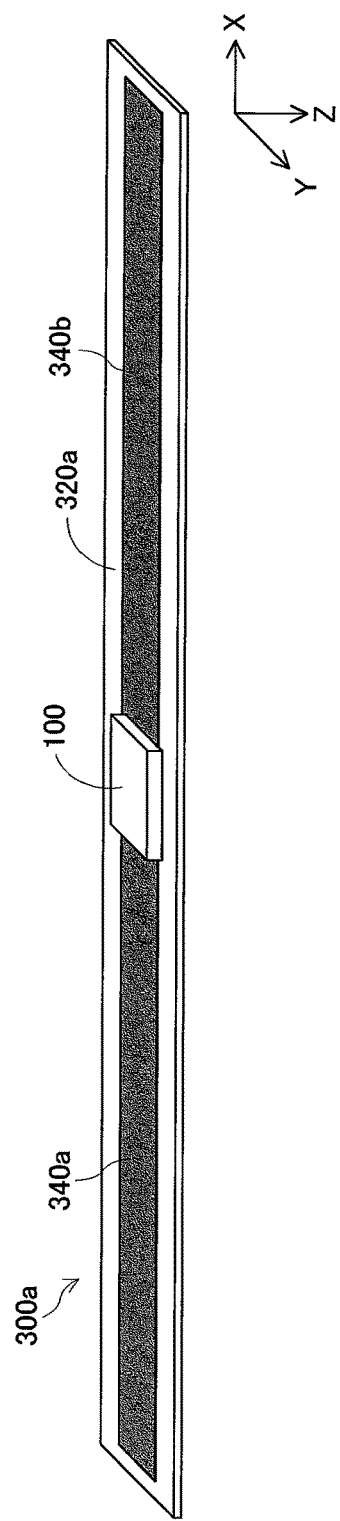
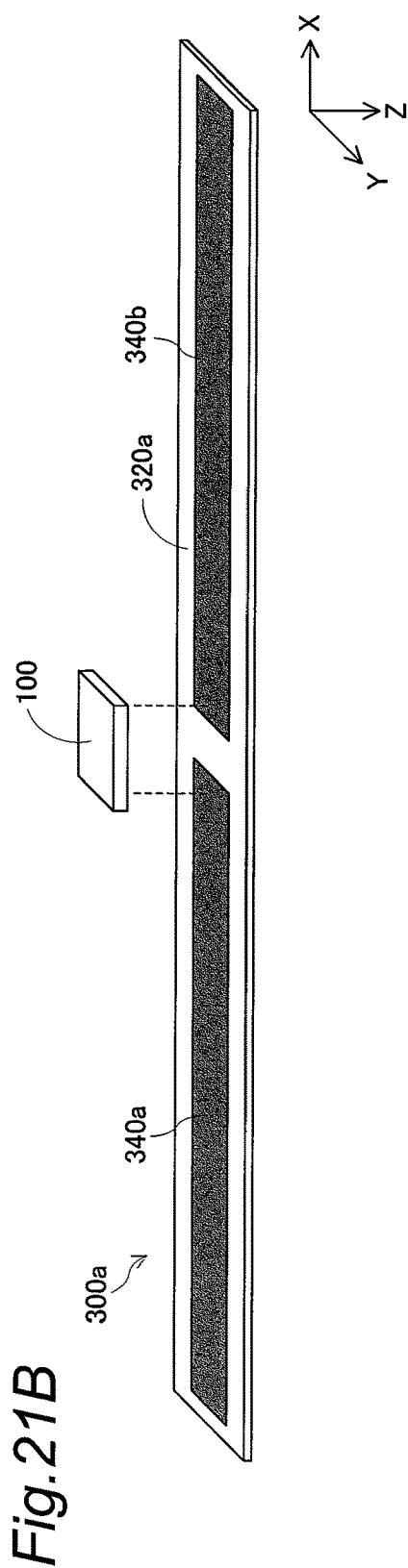

WIRELESS COMMUNICATION DEVICE, METHOD FOR MANUFACTURING SAME, SEAL FITTED WITH RFIC ELEMENT, AND METHOD FOR PRODUCING SAME

CROSS REFERENCE TO RELATED APPLICATIONS

This is a continuation application of international Application No. PCT/JP2015/080449, with an international filing date of Oct. 28, 2015, which claims priority of Japanese Patent Application No. 2014-227195 filed on Nov. 7, 2014 and Japanese Patent Application No. 2015-044178 filed on Mar. 6, 2015, the entire contents of each application are incorporated herein by reference.

BACKGROUND OF THE INVENTION

1. Field of the Invention

The present invention relates to a wireless communication device and a method for manufacturing the same and, more particularly, to a wireless communication device, such as an RFID (radio frequency identifier) tag including a radiation conductor base material including a principal surface on which a radiation conductor is located and an RFIC (radio frequency integrated circuit) element including a principal surface on which a terminal electrode is located, and a method for manufacturing the same.

The present invention also relates to a seal fitted with an RFIC element and a method for manufacturing the same and, more particularly, to a seal fitted with an RFIC element including an RFIC element including a principal surface on which a terminal electrode is located and a seal including an adhesive surface of a size larger than that of the principal surface of the RFIC element, and a method for producing the same.

2. Description of the Related Art

An RFID inlay or an RFID tag are manufactured by mounting an RFIC element (a package or a strap with an RFIC chip sealed therein) on a radiation conductor base material provided with a radiation conductor (radiation pattern). For a technique of connecting an RFIC element and a radiation conductor, connection by heating and melting of solder (see JP 2009-87068 A or JP 2009-129093 A) or connection by ultrasonic bonding (see JP 2012-32931 A or JP 2013-45780 A) is typically used.

However, in the case of the connection by heating and melting of solder, a connection portion must be heated to the melting point of solder or higher. Since a radiation conductor base material is required to have high heat resistance, an inexpensive material such as PET cannot be used for the radiation conductor base material. In the case of the connection by ultrasonic bonding, a bump must be melted ultrasonically and therefore it takes a time for completing the bonding.

Particularly, when a radiation conductor base material with flexibility is used for affixing an RFID inlay or an RFID tag to a curved surface member or a flexible member, a stress may concentrate on a connection portion between an RFIC element and a radiation conductor, resulting in destruction of the connection portion.

SUMMARY OF THE INVENTION

Preferred embodiments of the present invention provide a wireless communication device capable of being manufactured in a simplified manner and of reducing the risk of reduction in reliability of connection between an RFIC element and a radiation conductor, and a method for manufacturing the same.

Preferred embodiments of the present invention also provide a seal fitted with an RFIC element enabling simplified manufacturing of the wireless communication device and capable of reducing the risk of reduction in reliability of connection between an RFIC element and a radiation conductor, and a method for producing the same.

A wireless communication device according to a preferred embodiment of the present invention includes a radiation conductor base material including a radiation conductor and a principal surface on which at least a portion of the radiation conductor is provided; an RFIC element including a principal surface on which a terminal electrode is provided; and a seal including an adhesive surface on a seal base material, the RFIC element being disposed on the principal surface of the radiation conductor base material such that the terminal electrode directly or indirectly and slidably contacts with the portion of the radiation conductor, the seal being affixed with the adhesive surface to the radiation conductor base material to cover at least a portion of the RFIC element so as to fix the RFIC element to the radiation conductor base material.

Preferably, the seal includes a protective material disposed on a principal surface of the seal base material and is affixed to the radiation conductor base material such that the protective material overlaps with the terminal electrode in a planar view.

More preferably, the portion of the radiation conductor includes a first slit, and the protective material of the seal includes a second slit and is affixed to the radiation conductor base material such that the second slit overlaps with the first slit in a planar view.

Preferably, the adhesive surface includes a first adhesive surface and a second adhesive surface surrounding the first adhesive surface, and the first adhesive surface and the second adhesive surface adhere to the RFIC element and the radiation conductor base material, respectively.

Preferably, the radiation conductor base material, the RFIC element, and the seal are flexible.

Preferably, the RFIC element includes an RFIC chip processing a high-frequency signal, a power feeding circuit including a resonance frequency corresponding to a communication frequency, and a substrate including the RFIC chip mounted thereon and the power feeding circuit built therein, and the terminal electrode is provided on a principal surface of the substrate and connected through the power feeding circuit to the RFIC chip.

A seal fitted with an RFIC element according to a preferred embodiment of the present invention is a seal fitted with an RFIC element including an RFIC element including a principal surface on which a terminal electrode is provided; and a seal including an adhesive surface on a seal base material, the seal includes an RFIC element fixed to a partial region of the adhesive surface such that the terminal electrode is exposed, and another partial region of the adhesive surface is a region adhering to a radiation conductor base material such that the terminal electrode directly or indirectly and slidably contacts with a portion of a radiation conductor on a principal surface of the radiation conductor base material.

A method for manufacturing a wireless communication device according to a preferred embodiment of the present invention includes a preparing step of preparing a radiation conductor base material including a radiation conductor and including a principal surface on which at least a portion of the radiation conductor is formed, an RFIC element including a principal surface on which a terminal electrode is formed, and a seal including an adhesive surface on a seal base material; a first affixing step of producing a seal fitted with an RFIC element by affixing the RFIC element to a partial region of the adhesive surface of the seal such that the terminal electrode is exposed; and a second affixing step of affixing another partial region of the adhesive surface of the seal fitted with an RFIC element to the principal surface of the radiation conductor base material such that the terminal electrode directly or indirectly and slidably contacts with the portion of the radiation conductor.

A method for manufacturing a wireless communication device according to a preferred embodiment of the present invention is a method for manufacturing an RFID tag by using a seal fitted with an RFIC element including an RFIC element including a principal surface on which a terminal electrode is formed and a seal including an adhesive surface on a seal base material, the seal fitted with an RFIC element being formed by affixing the RFIC element to the adhesive surface such that the terminal electrode is exposed, the method including a preparing step of preparing a radiation conductor base material including a radiation conductor and including a principal surface on which at least a portion of the radiation conductor is formed; and an affixing step of affixing the seal fitted with an RFIC element to the principal surface of the radiation conductor base material such that the terminal electrode directly or indirectly and slidably contacts with the portion of the radiation conductor.

A method for producing a seal fitted with an RFIC element according to a preferred embodiment of the present invention includes a preparing step of preparing an RFIC element including a principal surface on which a terminal electrode is formed and a seal including an adhesive surface on a seal base material; and an affixing step of affixing the RFIC element to the adhesive surface of the seal such that the terminal electrode is exposed, wherein the seal fitted with an RFIC element is a member affixed to a radiation conductor base material such that the terminal electrode directly or indirectly and slidably contacts with at least a portion of a radiation conductor formed on a principal surface of the radiation conductor base material.

Since the RFIC element is connected to the radiation conductor by using the seal, an inexpensive material such as PET is able to be used for the radiation conductor base material and a time required to connect the RFIC element to the radiation conductor is able to be reduced. As a result, the wireless communication device is able to be manufactured in a simplified manner.

Since the terminal electrode of the RFIC element only contacts with the radiation conductor, even when the radiation conductor base material is bent, no stress concentrates on a contact portion between a terminal electrode and an end portion. This reduces the risk of reduction in reliability of connection between the RFIC element and the radiation conductor.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 21A is a perspective view of an RFID tag of a further preferred embodiment of the present invention that is a modification of the third preferred embodiment of the present invention viewed obliquely from above and FIG. 21B is a perspective view of the RFID tag of the further preferred embodiment of the present invention that is a modification of the third preferred embodiment of the present invention disassembled and viewed obliquely from above.

DETAILED DESCRIPTION OF THE PREFERRED EMBODIMENTS

First Preferred Embodiment

Figure 1A:
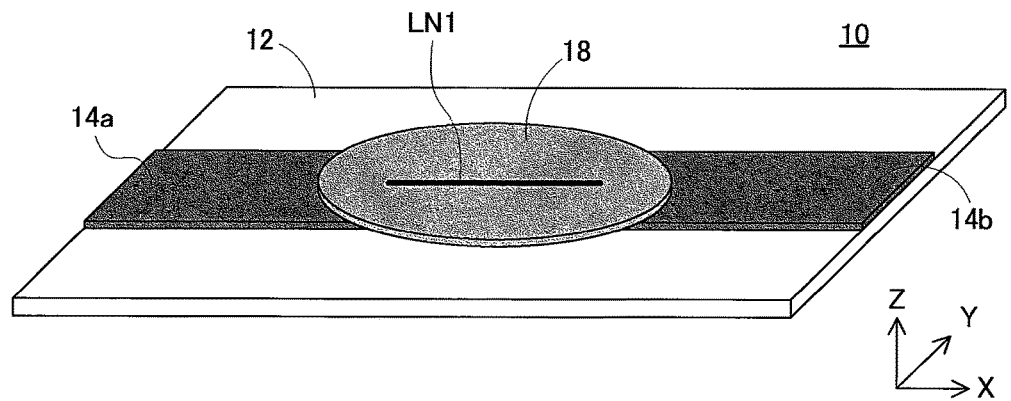
FIG. 1A is a perspective view of an RFID tag of a first preferred embodiment of the present invention viewed obliquely from above and FIG. 1B is an exploded perspective view of the RFID tag of the first preferred embodiment of the present invention disassembled and viewed obliquely from above.
Figure 1B:
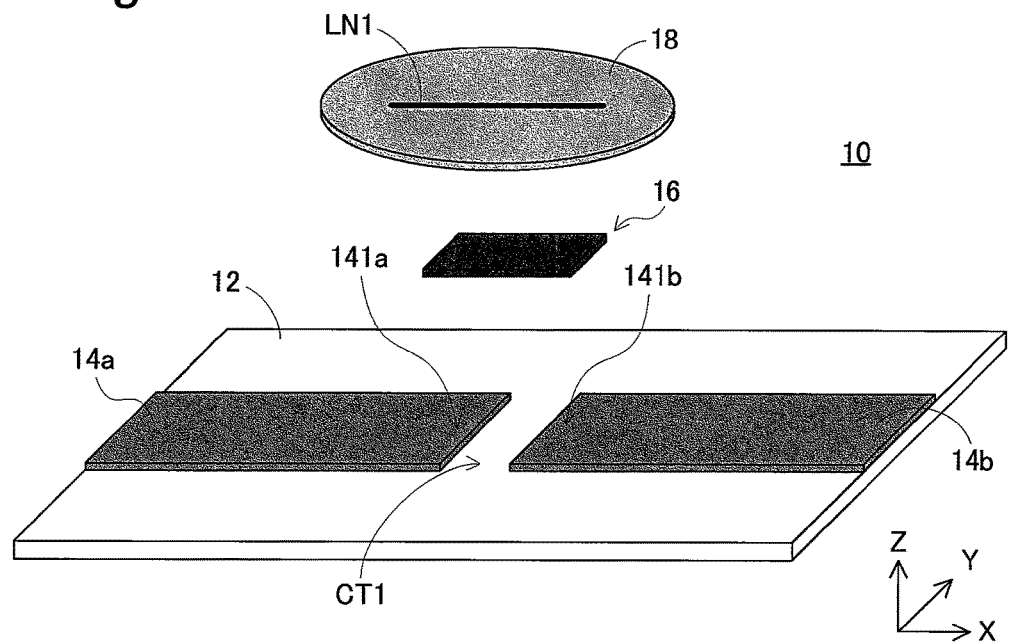

Referring to FIGS. 1A and 1B, an RFID tag 10 of a first preferred embodiment is an example of the present invention of a wireless communication device that is an RFID tag typically using the 900 MHz band as a communication frequency, for example, and includes a plate-shaped radiation conductor base material 12 including a rectangular or substantially rectangular principal surface, a plate-shaped RFIC element 16 including a rectangular or substantially rectangular principal surface considerably smaller than the principal surface of the radiation conductor base material 12, and a thin film seal 18 including a truly circular principal surface larger than the principal surface of the RFIC element 16.

In the first preferred embodiment, an X-axis is assigned to a longitudinal direction of the radiation conductor base material 12, a Y-axis is assigned to a width direction of the radiation conductor base material 12, and a Z-axis is assigned to a thickness direction of the radiation conductor base material 12.

Figure 2A:
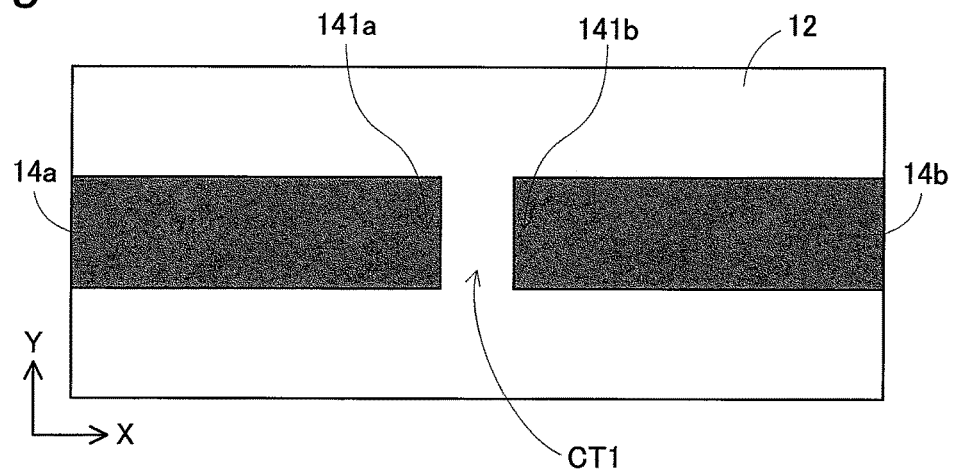
FIG. 2A is a top view of a radiation conductor base material of the first preferred embodiment of the present invention viewed from directly above.
Figure 2B:
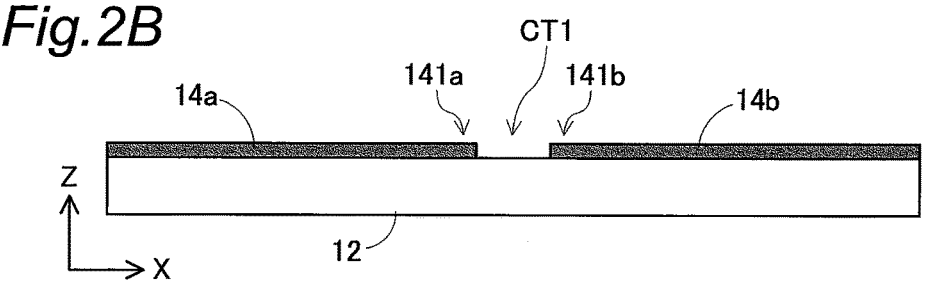
FIG. 2B is a side view of the radiation conductor base material of the first preferred embodiment of the present invention viewed from the side.
Figure 2C:
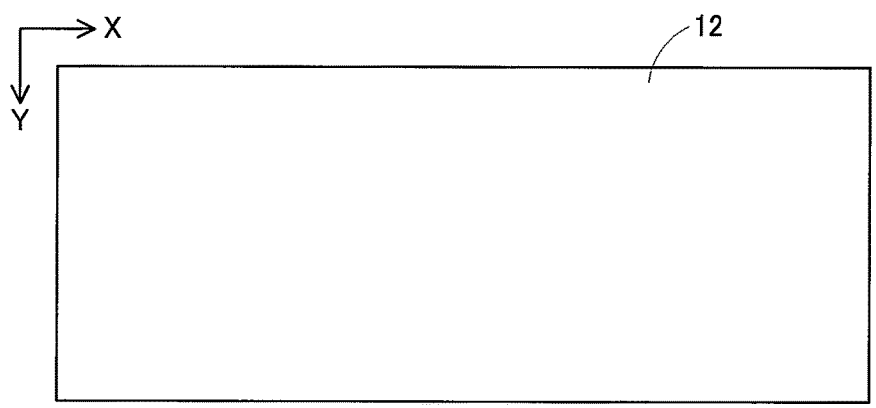
FIG. 2C is a bottom view of the radiation conductor base material of the first preferred embodiment of the present invention viewed from directly below.

Referring to FIGS. 2A to 2C, the radiation conductor base material 12 has flexibility, and belt-shaped radiation conductors 14a and 14b are provided on a principal surface thereof (in particular, an upper surface). Each of the radiation conductors 14a and 14b has a length less than a half of the length of the radiation conductor base material 12 and a width less than a half of the width of the radiation conductor base material 12 and extends along the X-axis through a center position in the Y-axis direction on the upper surface of the radiation conductor base material 12. The radiation conductor 14a is located on the negative side in the X-axis direction and the radiation conductor 14b is located on the positive side in the X-axis direction.

When an end portion of the radiation conductor 14a on the positive side in the X-axis direction is defined as a "first end portion 141a" and an end portion of the radiation conductor 14b on the negative side in the X-axis direction is defined as a "second end portion 141b," an absent portion CT1 absent of both the radiation conductors 14a and 14b is provided between the first end portion 141a and the second end portion 141b.

Figure 3A:
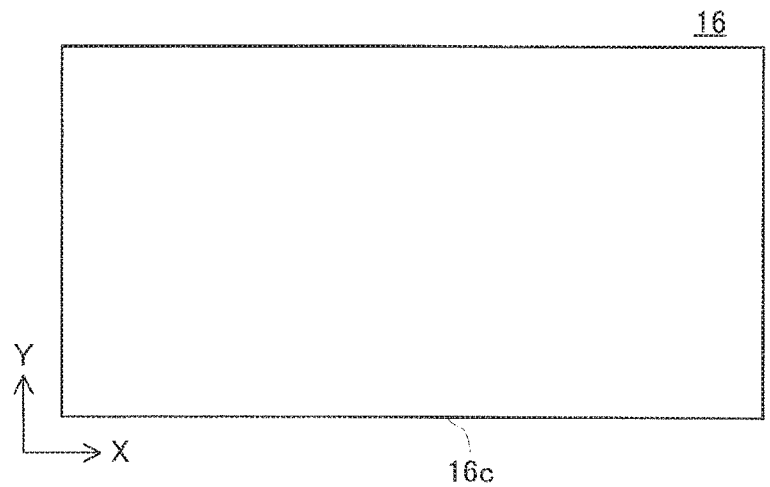
FIG. 3A is a top view of an RFIC element of the first preferred embodiment of the present invention viewed from directly above.
Figure 3B:
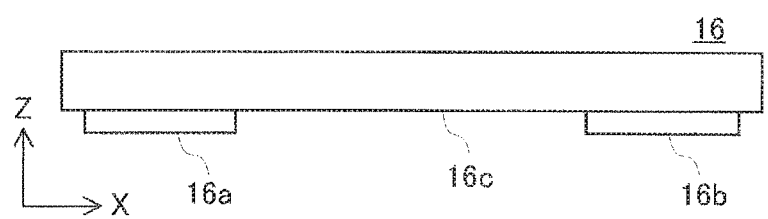
FIG. 3B is a side view of the RFIC element of the first preferred embodiment of the present invention viewed from the side.
Figure 3C:
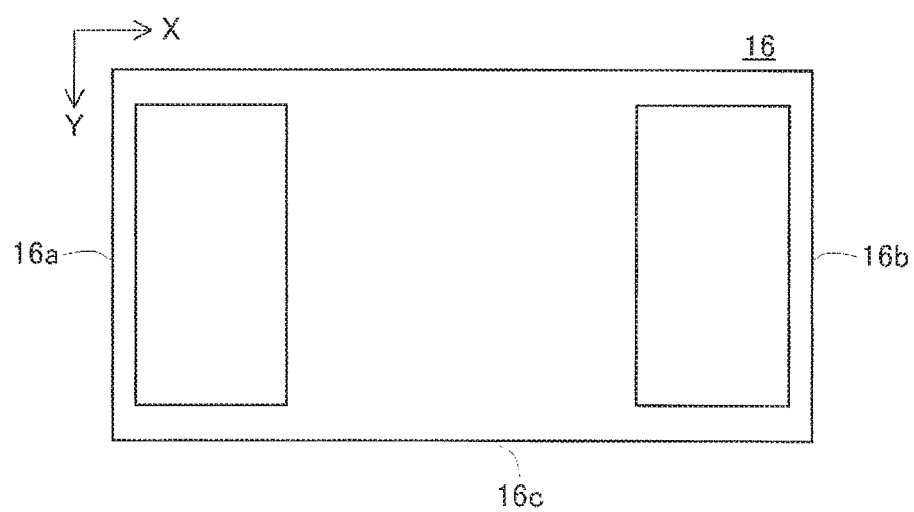
FIG. 3C is a bottom view of the RFIC element of the first preferred embodiment of the present invention viewed from directly below.

Referring to FIGS. 3A to 3C, the RFIC element 16 has a flexible substrate 16c including a thermoplastics resin with high heat resistance such as an LCP resin or a polyimide resin. A first terminal electrode 16a and a second terminal electrode 16b are provided on a principal surface (in particular, a lower surface) of the substrate 16c. The first terminal electrode 16a is disposed on an end portion on the negative side of the X-axis direction and the second terminal electrode 16b is disposed on an end portion on the positive side of the X-axis direction such that an interval between the first terminal electrode 16a and the second terminal electrode 16b is identical or substantially identical to an interval between the first end portion 141a and the second end portion 141b.

Figure 4A:
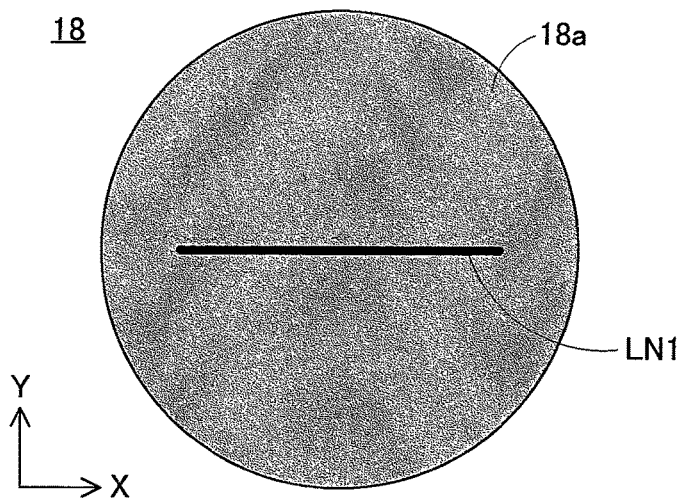
FIG. 4A is a top view of a seal of the first preferred embodiment of the present invention viewed from directly above.
Figure 4B:
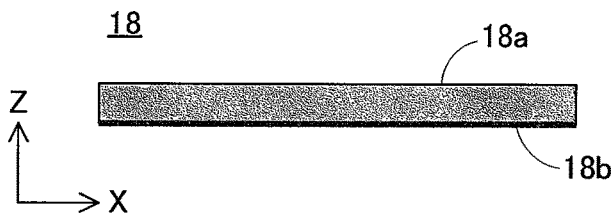
FIG. 4B is a side view of the seal of the first preferred embodiment of the present invention viewed from the side.
Figure 4C:
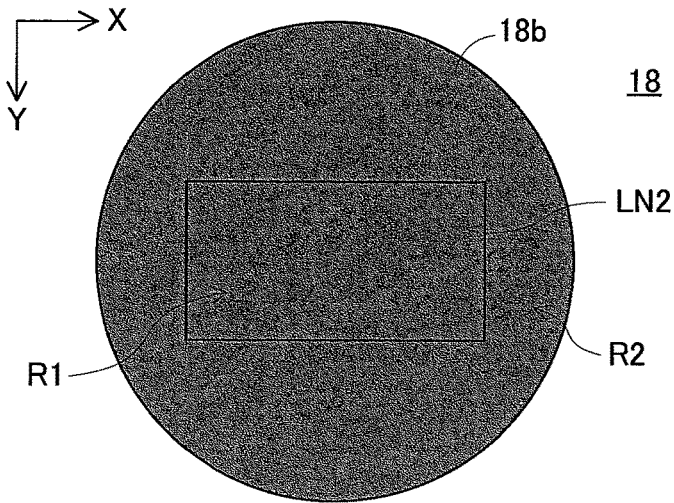
FIG. 4C is a bottom view of the seal of the first preferred embodiment of the present invention viewed from directly below.

Referring to FIGS. 4A to 4C, the seal 18 includes a flexible seal base material 18a made of paper or resin etc. An adhesive 18b such as an acrylic resin or an epoxy resin is applied to a lower surface of the seal base material 18a and the lower surface acts as an adhesive surface. At the center of the adhesive surface, a rectangular or substantially rectangular first adhesive region R1 is assigned that has the same or substantially the same size as that of the principal surface of the substrate 16c. A second adhesive region R2 is assigned around the first adhesive region R1 so that the first adhesive region R1 is surrounded by the second adhesive region R2.

Long sides and short sides of a rectangular or substantially rectangular shape defined by the first adhesive region R1 extend along the X-axis and the Y-axis, respectively. Based on this fact, a reference line LN1 extending along the X-axis is drawn at the center in the X-axis direction of the upper surface of the seal base material 18a. A reference line LN2 indicative of an outer edge of the first adhesive region R1 is drawn on the lower surface of the seal base material 18a. The location of the first adhesive region R1 is easily comprehended from the upper and lower surface sides of the seal 18 by reference to the reference lines LN1 and LN2.

Returning to FIGS. 1A and 1B, the RFIC element 16 is disposed on the upper surface of the radiation conductor base material 12 (in particular, on the absent portion CT1) such that the first terminal electrode 16a slidably contacts with the first end portion 141a while the second terminal electrode 16b slidably contacts with the second end portion 141b. As a result, the radiation conductors 14a and 14b define and function as a dipole antenna. Therefore, although being electrically connected, the terminal electrodes of the RFIC element and an RFIC-element connection portion of the radiation conductor are not mechanically connected (are slidable).

The seal 18 is affixed to the radiation conductor base material 12 to cover the RFIC element 16 disposed on the upper surface of the radiation conductor base material 12. In this state, the first adhesive region R1 adheres to the substrate 16c and the second adhesive region R2 adheres to the radiation conductor base material 12 and the radiation conductors 14a, 14b on the upper surface thereof. Since the first adhesive region R1 is surrounded by the second adhesive region R2, the RFIC element 16 is strongly fixed to the radiation conductor base material 12. In the RFIC element 16, the terminal electrodes 16a, 16b are most projected portions for the seal 18. If the seal 18 is affixed to the radiation conductor base material 12, the seal 18 curves to cover the RFIC element 16 when being affixed to the radiation conductor base material 12 and, therefore, the affixed seal 18 generates a stress in an attempt to return to the original planar state. Since this stress acts as a pressure pressing the terminal electrodes 16a, 16b of the RFIC element 16 against the radiation conductors 14a, 14b, the electric connection is stably maintained between the terminal electrodes 16a, 16b and the radiation conductors 14a, 14b. As a result, the RFIC element 16 creates a state of stable electric connection while being slidable.

If the radiation conductor base material 12 and/or the seal 18 are made transparent, whether the first and second terminal electrodes 16a and 16b of the RFIC element 16 are connected to the radiation conductors 14a and 14b is easily confirmed.

Figure 5:
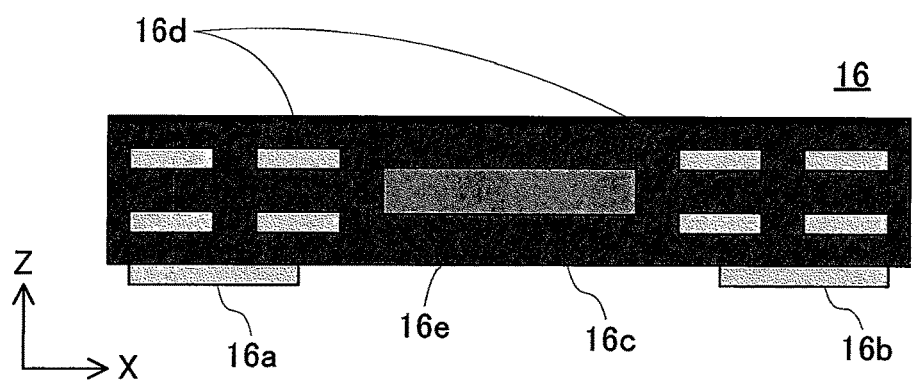
FIG. 5 is a cross-sectional view of a structure of the RFIC element of the first preferred embodiment of the present invention.

Referring to FIG. 5, an RFIC chip 16e and a power feeding circuit 16d are mounted on the substrate 16c of the RFIC element 16. The RFIC chip 16e is a circuit processing an RFID signal (high-frequency signal) and includes a first input/output terminal and a second input/output terminal (both not shown). The power feeding circuit 16d includes a resonance circuit with a resonance frequency corresponding to a communication frequency (carrier frequency) and is a circuit that widens a passband of a communication signal.

In particular, the RFIC chip 16e is connected via the power feeding circuit 16d to the radiation conductors 14a, 14b. Since the power feeding circuit 16d built into the substrate 16c has a resonance frequency corresponding to a communication frequency, the communication characteristics of the RFID tag 10 do not significantly depend on a size of the radiation conductors 14a, 14b, a material of an object to which the RFID tag 10 is attached, a bonding state between the radiation conductors 14a, 14b and the RFIC element 16, etc. Therefore, the radiation conductors 14a, 14b may not necessarily need to have an electrical length that is an integral multiple of λ/2. Although the power feeding circuit 16d is preferably made of a material with high electric conductivity since the circuit resonates and a current intensively flows through the circuit, the radiation conductors are conductors including an electric field (voltage) distribution and, therefore, the electrical properties of the RFID tag 10 are hardly degraded if the terminal electrodes 16a, 16b of the power feeding circuit and the radiation conductors 14a, 14b have a contact resistance of several dozen Ω or less.

The first terminal electrode 16a and the second terminal electrode 16b on the lower surface of the substrate 16c are connected via the power feeding circuit 16d to the first input/output terminal and the second input/output terminal, respectively, of the RFIC chip 16e.

Figure 6:
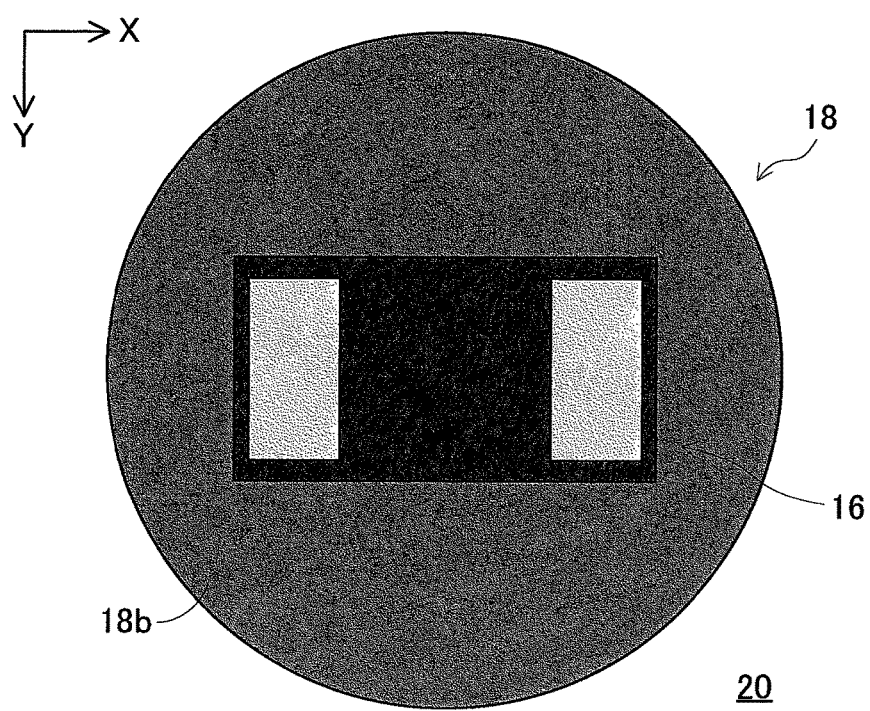
FIG. 6 is a bottom view of a seal fitted with an RFIC element of the first preferred embodiment of the present invention viewed from directly below.
Figure 7A:
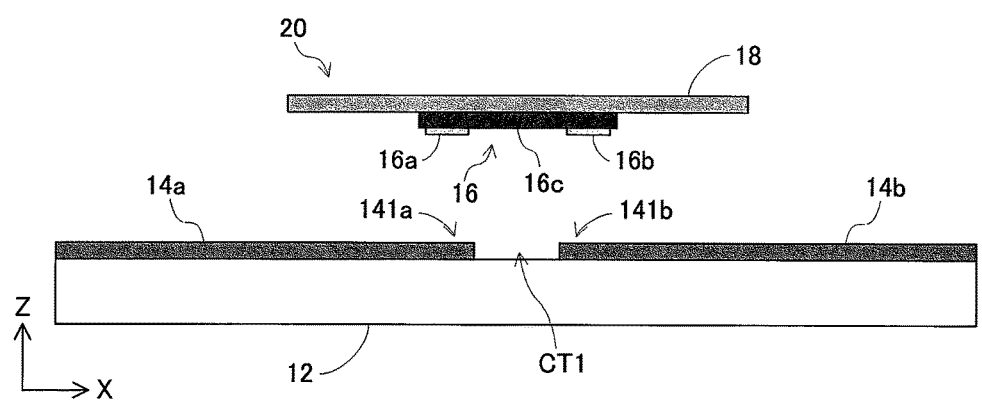
FIG. 7A is a schematic of a portion of manufacturing steps of the RFID tag of the first preferred embodiment of the present invention and FIG. 7B is a schematic of another portion of the manufacturing steps of the RFID tag of the first preferred embodiment of the present invention.
Figure 7B:
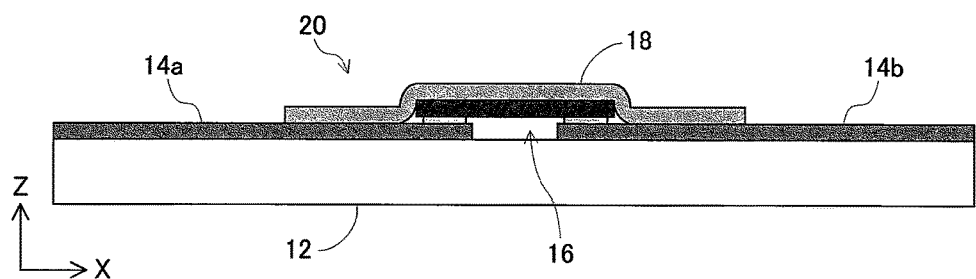

A method for manufacturing the RFID tag 10 will be described with reference to FIGS. 6, 7A, and 7B. First, the RFIC element 16 is affixed to the lower surface of the seal 18. Particularly, the upper surface of the substrate 16c of the RFIC element 16 is affixed to the first adhesive region R1 of the seal 18. As a result, a seal 20 fitted with an RFIC element is produced that has the first and second terminal electrodes 16a and 16b exposed outside.

Figure 8:
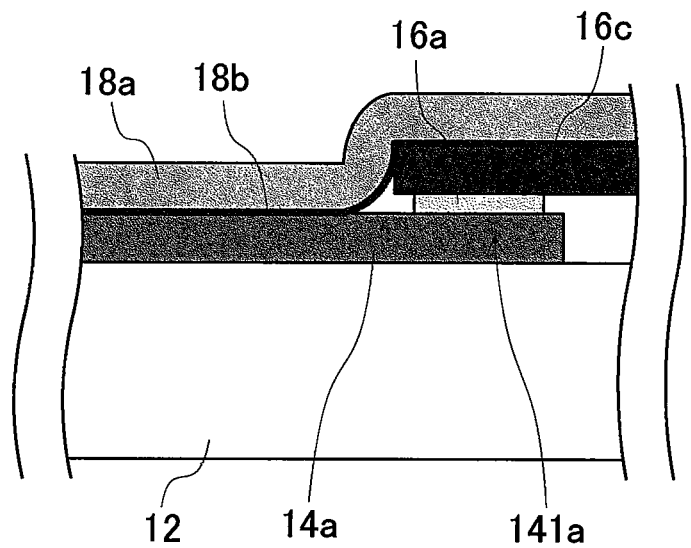
FIG. 8 is an enlarged view of a portion of a structure of the RFID tag of the first preferred embodiment of the present invention.

The seal 20 fitted with an RFIC element is subsequently affixed to the radiation conductor base material 12. In this case, the first terminal electrode 16a is brought into contact with or pressed against the first end portion 141a of the radiation conductor 14a, and the second terminal electrode 16b is brought into contact with or pressed against the second end portion 141b of the radiation conductor 14b. The second adhesive region R2 adheres to the radiation conductor base material 12 and the radiation conductors 14a, 14b. As a result, the RFID tag 10 is completed. A state of the first terminal electrode 16a being in contact with the first end portion 141a of the radiation conductor 14a is shown in FIG. 8 on an enlarged scale. Since the seal 18 curves to cover the RFIC element 16 when being affixed to the radiation conductor base material 12, the affixed seal 18 generates a stress in an attempt to return to the original planar state. This stress acts as a pressure pressing the terminal electrode 16a of the RFIC element 16 against the radiation conductor 14a, and the electric connection of the terminal electrode 16a to the radiation conductor 14a is stably maintained by this pressure after the seal is affixed. As a result, the RFIC element 16 creates a state of stable electric connection while being slidable. A PET film or paper may be used as a material of the seal 18, and a paste of a strongly adhesive agent may be used as an adhesive material.

Figure 9:
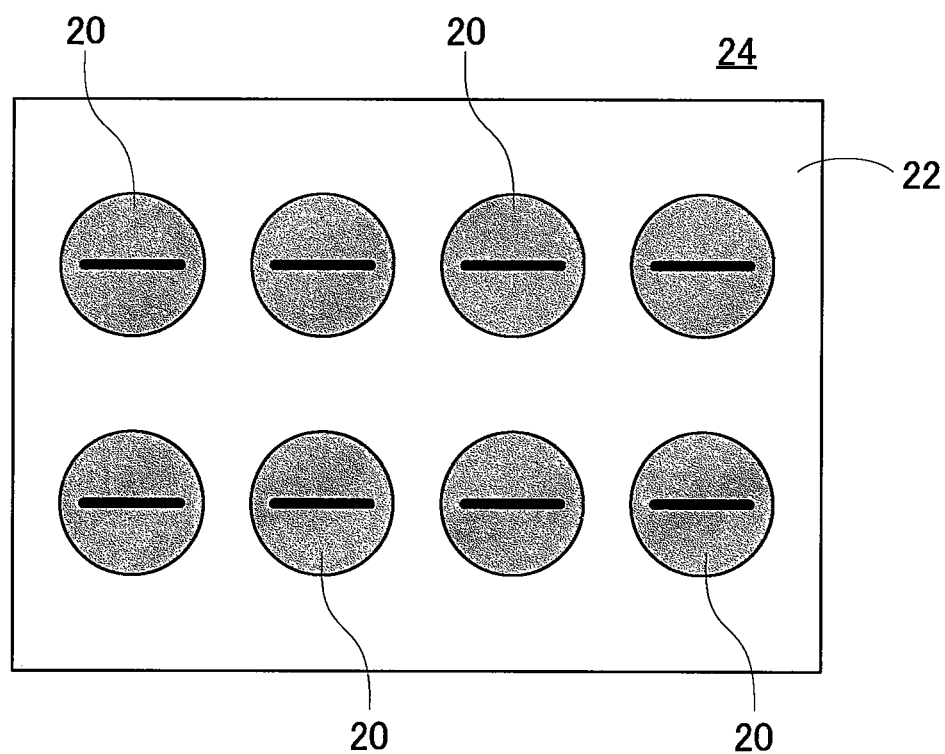
FIG. 9 is a top view of a mount including a plurality of seals fitted with RFIC elements affixed thereto viewed from directly above.

The seals 20 fitted with RFIC elements may be affixed to a mount 22 as shown in FIG. 9. By producing such a mount 24 with seals, a business operator responsible for production of the seals 20 fitted with RFIC elements may be separated from a business operator manufacturing the RFID tags 10 by using the seals 20 fitted with RFIC elements. As a result, the business operator manufacturing the RFID tags 10 can freely change the shape of the tags and can design the tags according to a use application. Since RFID tags can be made by only manually affixing the seals 20 to the radiation conductors 14, the RFID tags are able to be made even without dedicated equipment.

As described above, since the RFIC element 16 is connected to the radiation conductors 14a, 14b by using the seal 18, the RFID tag 10 can be manufactured in a simplified manner. In particular, while the bonding by heating and melting of solder makes it not possible to use an inexpensive material such as PET for the radiation conductor base material 12 and the ultrasonic bonding requires a time for completing the bonding, providing the seal 18 as in the first preferred embodiment makes it possible to use an inexpensive conductor material such as an aluminum foil for a radiation conductor and an inexpensive material such as PET for the radiation conductor base material 12 and also enables a reduction in time required to connect the RFIC element 16 to the radiation conductors 14a, 14b. This leads to simplification of manufacturing steps of the RFID tag 10. It is noted that paper may be used as the radiation conductor base material to utilize as a radiation conductor a conductive pattern drawn on the paper with a conductive ink containing a conductive material, such as Ag, as a main component.

Since the RFIC element 16 is provided with the power feeding circuit 16d widening a resonance frequency band, desired communication characteristics are acquired even with a simple mounting method such as fixing the RFIC element 16 by the seal 18.

Additionally, the first terminal electrodes 16a and 16b of the RFIC element 16 only contact with the first end portion 141a of the radiation conductor 14a and the second end portion 141b of the radiation conductor 14b. Therefore, although being electrically connected, the first terminal electrodes 16a and 16b are not physically or mechanically bonded to the first end portion 141a and the second end portion 141b.

Therefore, even when the radiation conductor base material 12 is bent, no stress concentrates on a contact portion between the first terminal electrode 16a and the first end portion 141a and a contact portion between the second terminal electrode 16b and the second end portion 141b. This reduces the risk of reduction in reliability of connection between the RFIC element 16 and the radiation conductors 14a, 14b (the risk of destruction of a connection portion between the RFIC element 16 and the radiation conductors 14a, 14b).

Figure 10:
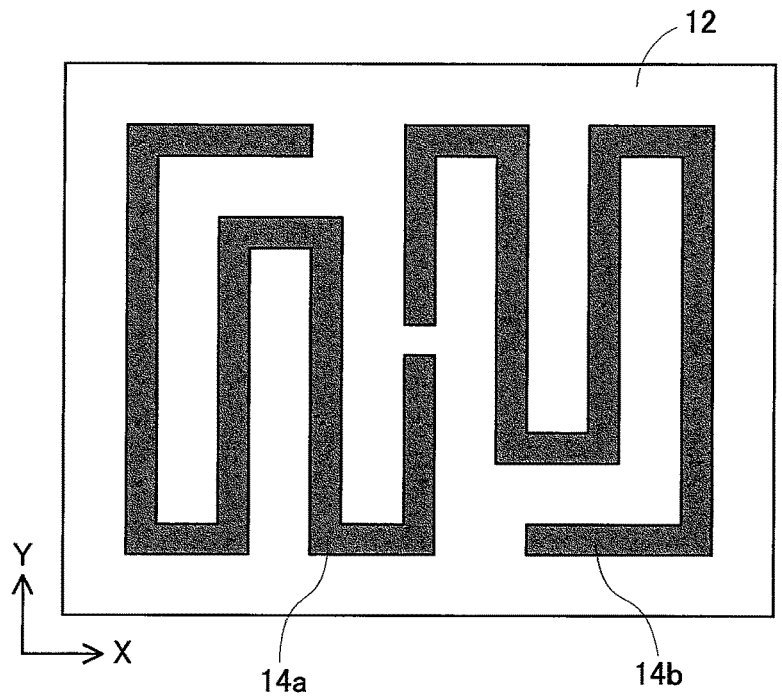
FIG. 10 is a top view of a radiation conductor base material of another preferred embodiment of the present invention that is a modification of the first preferred embodiment of the present invention viewed from directly above.

In the first preferred embodiment, the radiation conductors 14a and 14b preferably extend linearly along the X-axis. However, the radiation conductors 14a and 14b may be serpentine with respect to the X-axis (see FIG. 10).

Figure 11:
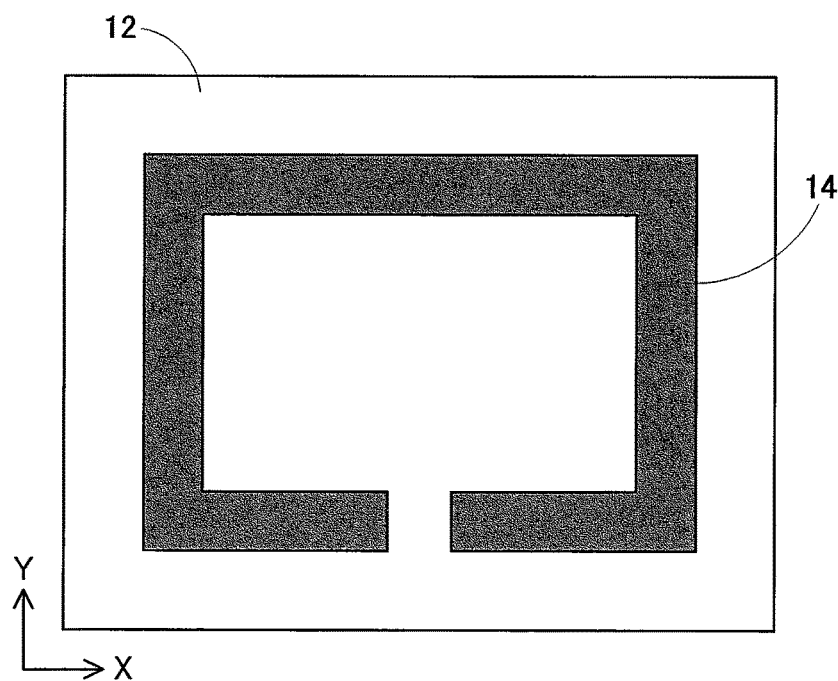
FIG. 11 is a top view of a radiation conductor base material of a further preferred embodiment of the present invention that is a modification of the first preferred embodiment of the present invention viewed from directly above.

In the first preferred embodiment, the RFIC element 16 preferably extends between the first end portion 141a of the radiation conductor 14a and the second end portion 141b of the radiation conductor 14b so that the radiation conductors 14a and 14b define and function as a dipole antenna. However, if a loop-shaped radiation conductor 14 shown in FIG. 11 is provided on the upper surface of the radiation conductor base material 12 and the RFIC element 16 extends between the both ends of the radiation conductor 14, the radiation conductor 14 defines and functions as a loop antenna.

In the first preferred embodiment, preferably only the lower surface of the seal 18 is the adhesive surface. However, an adhesive agent may be applied to a region of the upper surface of the radiation conductor base material 12 other than the formation regions of the radiation conductors 14a and 14b so that the upper surface of the radiation conductor base material 12 defines an additional adhesive surface. As a result, the RFID tag 10 is able to be affixed to another article.

Figure 12:
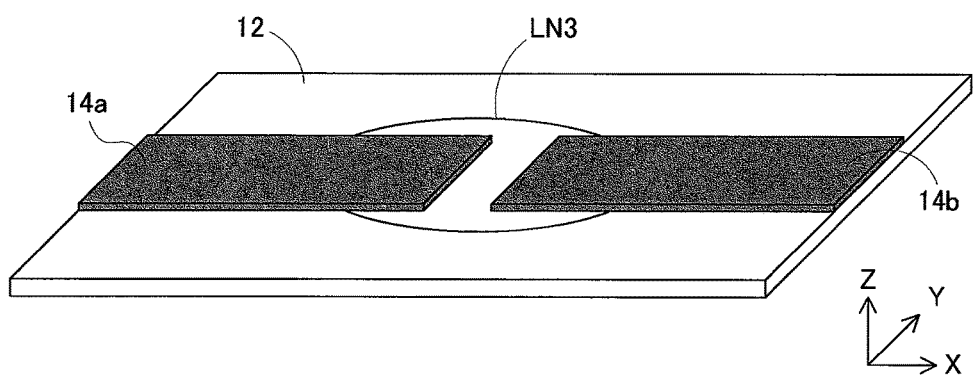
FIG. 12 is a perspective view of a radiation conductor base material of a yet further preferred embodiment of the present invention that is a modification of the first preferred embodiment of the present invention viewed obliquely from above.

If the radiation conductor base material 12 and/or the seal 18 are not transparent, it may be troublesome to confirm relative positions between the RFIC element 16 and the radiation conductors 14a, 14b when the seal 20 fitted with an RFIC element is affixed to the radiation conductor base material 12. Such a problem can be solved by drawing a reference line LN3 on the upper surface of the radiation conductor base material 12 in a manner shown in FIG. 12.

Although the principal surface of the seal 18 preferably is a true circle in the first preferred embodiment, the shape of the principal surface of the seal 18 may be an ellipse or a rectangle with the longer axis or the long sides aligned with the X-axis. As a result, the location of the first adhesive region R1 is easily comprehended from the upper surface side of the seal 18 even without the reference line LN1.

In the first preferred embodiment, the radiation conductors 14a and 14b preferably are provided on the upper surface of the radiation conductor base material 12, and the first terminal electrode 16a and the second terminal electrode 16b are provided on the lower surface of the substrate 16c. However, if another radiation conductor considerably smaller than the radiation conductor 14b is provided inside the RFIC element 16, the radiation conductor 14b is eliminated from the upper surface of the radiation conductor base material 12, and the second terminal electrode 16b is eliminated from the lower surface of the substrate 16c.

In this preferred embodiment, the radiation conductors 14a and 14b preferably are provided only on the upper surface of the radiation conductor base material 12. However, the radiation conductors 14a and 14b may be provided on the lower surface of the radiation conductor base material 12 except the first end portion 141a and the second end portion 141b, and the first end portion 141a and the second end portion 141b may extend out to the upper surface of the radiation conductor base material 12.

In this preferred embodiment, the size of the principal surface of the seal 18 preferably exceeds the size of the principal surface of the RFIC element 16. However, the size of the principal surface of the seal 18 may not necessarily need to exceed the size of the principal surface of the RFIC element 16 (may not entirely cover the RFIC element 16) as long as the RFIC element 16 is able to be fixed to the radiation conductor base material 12.

In this preferred embodiment, the first terminal electrode 16a preferably is in direct contact (conductive in terms of a direct current with) the first end portion 141a of the radiation conductor 14a, and the second terminal electrode 16b is in direct contact with (conductive in terms of a direct current with) the second end portion 141b of the radiation conductor 14b. However, the first terminal electrode 16a and the second terminal electrode 16b may be in indirect contact with (capacitively coupled via a dielectric to) the first end portion 141a and the second end portion 141b.

Second Preferred Embodiment

Referring to FIGS. 13A, 13B, and 14A to 14C, an RFID tag 10' of a second preferred embodiment of the present invention is an example of a wireless communication device that is an RFID tag typically using the 900 MHz band as a communication frequency, for example, and includes the plate-shaped radiation conductor base material 12 including a rectangular or substantially rectangular principal surface, the plate-shaped RFIC element 16 including a rectangular or substantially rectangular principal surface considerably smaller than the principal surface of the radiation conductor base material 12, and a thin film seal 181 including a truly circular principal surface larger than the principal surface of the RFIC element 16.

Also in the second preferred embodiment, the X-axis is assigned to a longitudinal direction of the radiation conductor base material 12, the Y-axis is assigned to a width direction of the radiation conductor base material 12, and the Z-axis is assigned to a thickness direction of the radiation conductor base material 12. Additionally, as described later, the RFIC element 16 is affixed to the seal 181 before being disposed on the radiation conductor base material 12. Therefore, the RFIC element 16 defines a seal 20' fitted with an RFIC element together with the seal 181.

Figure 13A:
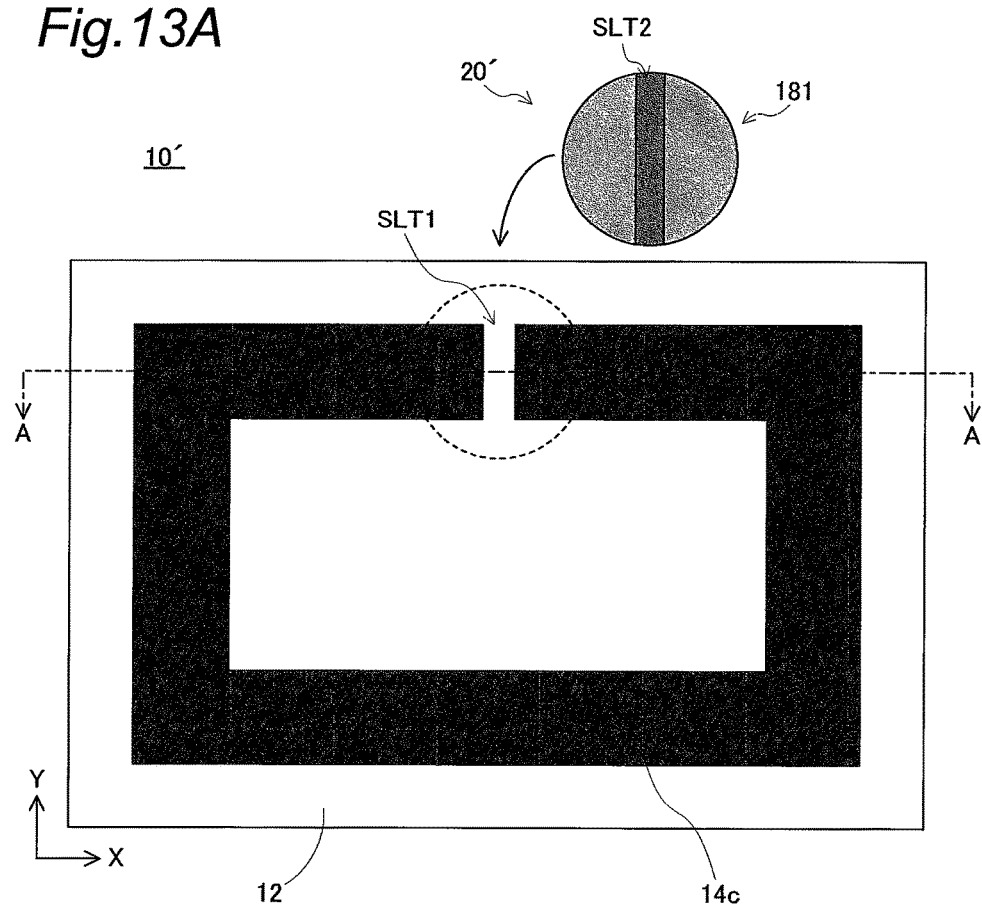
FIG. 13A is an exploded plane view of an RFID tag of a second preferred embodiment of the present invention disassembled and viewed from directly above and FIG. 13B is a cross-sectional view of the RFID tag of the second preferred embodiment of the present invention taken along a cross section A-A.
Figure 13B:
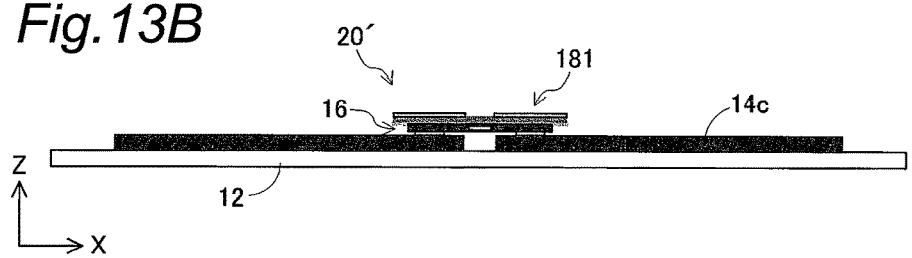

Particularly, referring to FIGS. 13A and 13B, a belt-shaped radiation conductor 14c is provided on the principal surface (in particular, the upper surface) of the radiation conductor base material 12. The radiation conductor 14c extends in a loop-shape in the vicinity of an outer edge of the upper surface of the radiation conductor base material 12, and a slit SLT1 is located between both ends thereof. The slit SLT1 is disposed at a center position in the X-axis direction located on the positive side in the Y-axis direction on the upper surface of the radiation conductor base material 12.

The slit SLT1 has a uniform or substantially uniform width over the entire length of the slit SLT1.

Figure 14A:
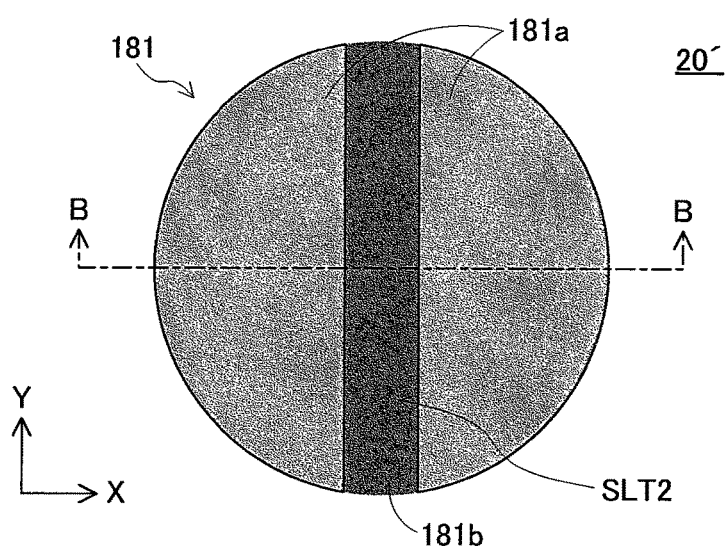
FIG. 14A is a top view of a seal fitted with an RFIC element of the RFID tag of the second preferred embodiment of the present invention viewed from directly above.
Figure 14B:
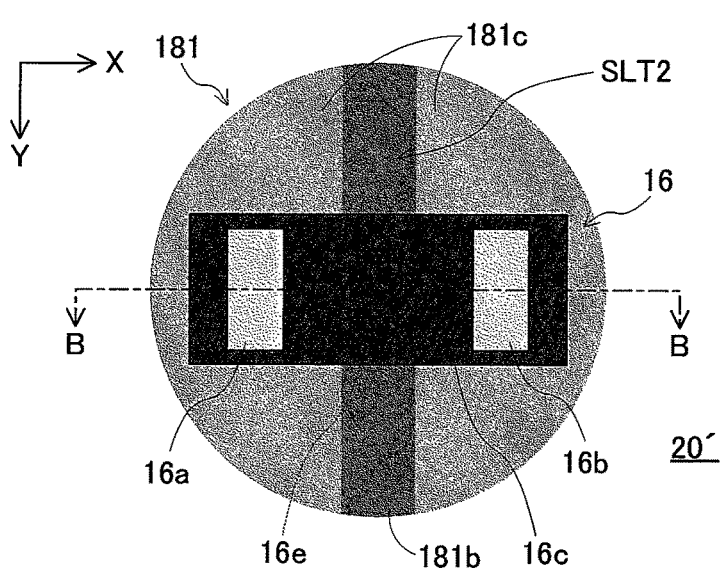
FIG. 14B is a bottom view of the seal fitted with an RFIC element of the RFID tag of the second preferred embodiment of the present invention viewed from directly below.
Figure 14C:
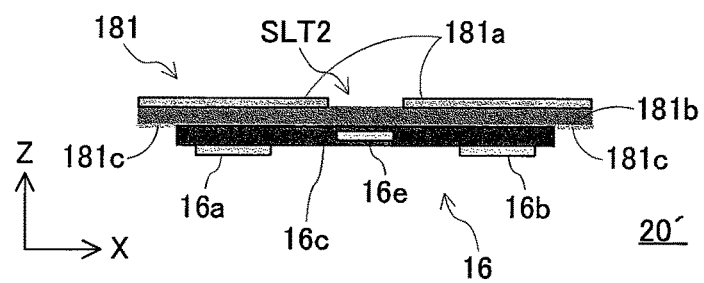
FIG. 14C is a cross-sectional view of the seal fitted with an RFIC element of the RFID tag of the second preferred embodiment of the present invention taken along a cross section B-B.

Referring to FIGS. 14A to 14C, the seal 181 includes a flexible seal base material 181b. A protective material 181a is disposed on an upper surface of the seal base material 181b, and an adhesive 181c is applied to a lower surface of the seal base material 181b.

A principal surface of the seal base material 181b defines a true circle. Based on this fact, the protective material 181a is produced by preparing a protective material including a principal surface of the same size as that of the principal surface of the seal base material 181b and by forming a slit SLT2 extending linearly through the center of the principal surface in the protective material. The width of the slit SLT2 is preferably identical or substantially identical to the width of the slit SLT1. The protective material 181a produced in this way is disposed on the upper surface of the seal base material 181b in a posture in which the circular arc thereof extends along the outer edge of the seal base material 181b such that the shape of the slit SLT2 is kept.

The diameter of the principal surface of the seal 181 slightly exceeds the length of the RFIC element 16. The RFIC element 16 is affixed to the lower surface of the seal 181 in a posture in which the upper surface thereof faces the lower surface of the seal 181 and the longitudinal direction thereof becomes perpendicular or substantially perpendicular to an extending direction of the slit SLT2. Therefore, when viewed in the Z-axis direction, the first terminal electrode 16a and the second terminal electrode 16b overlap with the protective material 181a. The RFIC chip 16e embedded in the RFIC element 16 is housed in a region of the slit SLT2 when viewed in the Z-axis direction.

The seal 20' fitted with an RFIC element including the structure as described above is affixed to the upper surface of the radiation conductor base material 12 such that the slit SLT2 overlaps with the slit SLT1 when viewed in the Z-axis direction. As a result, the RFIC element 16 is disposed on the upper surface of the radiation conductor base material 12 (in particular, at a position straddling the slit SLT1) such that the first terminal electrode 16a and the second terminal electrode 16b respectively come into contact with the both ends of the radiation conductor 14c. As a result, the radiation conductor 14c defines and functions as a loop antenna.

As can be seen from the above description, the slit SLT 2 is used as a positioning mark when the seal 20' fitted with an RFIC element is affixed to the upper surface of the radiation conductor base material 12. As a result, the work burden required for manufacturing the RFID tag 10' is reduced.

Since the first terminal electrode 16a and the second terminal electrode 16b overlap with the protective material 181a when viewed in the Z-axis direction, a strong bonding force is applied to the first terminal electrode 16a and the second terminal electrode 16b as well as the both ends of the radiation conductor 14c when the seal 20' fitted with an RFIC element is affixed to the upper surface of the radiation conductor base material 12. This consequently reduces the risk that the first terminal electrode 16a and the second terminal electrode 16b depart from the radiation conductor 14c during use.

Since the RFIC chip 16e is housed in the region of the slit SLT1 or SLT2 when viewed in the Z-axis direction, the risk of an excessive stress applied to the RFIC element 16 is significantly reduced when the seal 20' fitted with an RFIC element is affixed to the upper surface of the radiation conductor base material 12.

Third Preferred Embodiment

Figure 15:
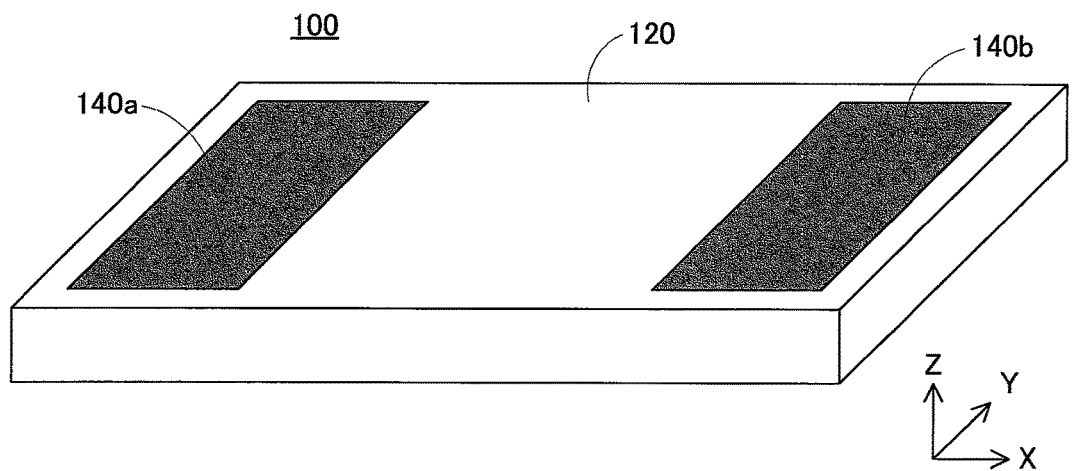
FIG. 15 is a perspective view of an RFIC element of a third preferred embodiment of the present invention viewed obliquely from above.

Referring to FIG. 15, an RFIC element 100 of a third preferred embodiment of the present invention is an RFIC element typically corresponding to a communication frequency of the 900 MHz band, i.e., the UHF band, for example, and includes a multilayer substrate 120 with a principal surface defining a rectangle or an approximate rectangle. The multilayer substrate 120 includes a base body that is a laminated body acquired by laminating flexible resin insulation layers of polyimide, liquid crystal polymer, etc., and the multilayer substrate 120 itself exhibits flexibility. The insulation layers made of these materials have the permittivity smaller than that of ceramic base material layers represented by LTCC.

In the third preferred embodiment, the X-axis is assigned to a longitudinal direction of the multilayer substrate 120, the Y-axis is assigned to a width direction of the multilayer substrate 120, and the Z-axis is assigned to a thickness direction of the multilayer substrate 120. The RFIC element 100 of the third preferred embodiment is able to be used as the RFIC element 16 of the first or second preferred embodiment.

Further referring to FIGS. 17A to 17C, 18A to 18C, and 19A to 19C, an RFIC chip 160 and a power feeding circuit 180 are built into the multilayer substrate 120, and a first terminal electrode 140a and a second terminal electrode 140b are provided on one principal surface of the multilayer substrate 120.

Specifically, the RFIC chip 160 has a structure in which various elements are built into a hard semiconductor substrate made of a semiconductor such as silicon, and has the one principal surface and the other principal surface defining a square. A first input/output terminal 160a and a second input/output terminal 160b are provided on the other principal surface of the RFIC chip 160 (described in detail later). The RFIC chip 160 is located at the center in each of the X-, Y-, and Z-axis directions inside the multilayer substrate 120 in a posture in which the sides of the square extends along the X-axis or the Y-axis and the one principal surface and the other principal surface face the positive side and the negative side, respectively, in the Z-axis direction.

The power feeding circuit 180 includes a coil conductor 200 and interlayer connection conductors 240a and 240b (described in detail later). The coil conductor 200 includes coil patterns 200a to 200c. A first coil portion CIL1 defines a portion of the coil pattern 200a, a second coil portion CIL2 defines a portion of the coil pattern 200b, and a third coil portion CIL3 and a fourth coil portion CIL4 define portions of the coil pattern 200c.

The first coil portion CIL1, the third coil portion CIL3, and the interlayer connection conductor 240a are arranged in the Z-axis direction at positions on the negative side in the X-axis direction, and the second coil portion CIL2, the fourth coil portion CIL4, and the interlayer connection conductor 240b are arranged in the Z-axis direction at positions on the positive side in the X-axis direction.

Based on this fact, the RFIC chip 160 is located between the first coil portion CIL1 and the second coil portion CIL2 and between the third coil portion CIL3 and the fourth coil portion CIL4 when the multilayer substrate 120 is viewed in each of the Z- and Y-axis directions.

The first terminal electrode 140a is disposed at a position on the negative side in the X-axis direction, and the second terminal electrode 140b is disposed at a position on the positive side in the X-axis direction. Both the first terminal electrode 140a and the second terminal electrode 140b are preferably made of flexible copper foil into a strip shape and have the respective principal surface sizes identical to each other. The short sides of the strip extend along the X-axis, and the long sides of the strip extend along the Y-axis.

Therefore, in a planar view of the multilayer substrate 120 in the lamination direction of the insulation layers, the RFIC chip 160 is interposed between a portion of the power feeding circuit 180 and another portion of the power feeding circuit 180. When the multilayer substrate 120 is viewed in the X-axis direction, the RFIC chip 160 overlaps with the power feeding circuit 180. In the planar view of the multilayer substrate 120, the power feeding circuit 180 partially overlaps with each of the first and second terminal electrodes 140a, 140b.

Since each of the insulation layers of the laminated body preferably is as thin as about 10 μm or greater and about 100 μm or less, for example, the RFIC chip 160 and the power feeding circuit 180 built into the multilayer substrate 120 can be seen through on the outside. Therefore, the connection state (presence of a broken wire) of the RFIC chip 160 and the power feeding circuit 180 is easily confirmed.

Referring to FIGS. 18A to 18C and 19A to 19C, the multilayer substrate 120 includes three laminated sheet-shaped insulation layers 120a to 120c. Among these layers, the insulation layer 120a defines an upper layer, the insulation layer 120b defines an intermediate layer, and the insulation layer 120c defines a lower layer.

The first terminal electrode 140a and the second terminal electrode 140b are provided on one principal surface of the insulation layer 120a. As described above, the first terminal electrode 140a is disposed on the negative side in the X-axis direction and the second terminal electrode 140b is disposed on the positive side in the X-axis direction.

At the center position of one principal surface of the insulation layer 120b, a rectangular or substantially rectangular through-hole HL1 is formed, reaching the other principal surface. The size of the through-hole HL1 is matched to the size of the RFIC chip 160. The coil pattern 200c made of flexible copper foil and extending in a belt shape is disposed around the through-hole HL1 on the one principal surface of the insulation layer 120b.

One end of the coil pattern 200c is disposed at a position overlapping with the first terminal electrode 140a in the planar view and is connected to the first terminal electrode 140a by an interlayer connection conductor 220a extending in the Z-axis direction. The other end of the coil pattern 200c is disposed at a position overlapping with the second terminal electrode 140b in the planar view and is connected to the second terminal electrode 140b by an interlayer connection conductor 220b extending in the Z-axis direction. The interlayer connection conductors 220a, 220b and the interlayer connection conductors 240a, 240b described later are hard metal bulks containing Sn as a main component.

Assuming that the one end of the coil pattern 200c is a starting end, the coil pattern 200c extends around the one end twice in the counterclockwise direction, extends to near the end portion of the negative side in the Y-axis direction, and then extends into the positive side in the X-axis direction. The coil pattern 200c subsequently bends near the end portion of the positive side in the X-axis direction toward the positive side in the Y-axis direction and goes around the other end twice in the counterclockwise direction before reaching the other end.

The coil patterns 200a and 200b made of flexible copper foil and extending in a belt shape are provided on one principal surface of the insulation layer 120c. In a planar view of the insulation layers 120b and 120c, one end of the coil pattern 200a is disposed at a position somewhat on the negative side in the Y-axis direction as compared to the one end of the coil pattern 200c, and the other end of the coil pattern 200a (a first coil end T1) is disposed at a position overlapping with a corner on the negative side in the X-axis direction and the positive side in the Y-axis direction out of the four corners of the rectangle drawn by the through-hole HL1.

One end of the coil pattern 200b is disposed at a position somewhat on the negative side in the Y-axis direction as compared to the other end of the coil pattern 200c, and the other end of the coil pattern 200b (a second coil end T2) is disposed at a position overlapping with a corner on the positive side in the X-axis direction and the positive side in the Y-axis direction out of the four corners of the rectangle drawn by the through-hole HL1. Both the first coil end T1 and the second coil end T2 are rectangular or substantially rectangular in the planar view of the insulation layer 120c.

Assuming that the one end of the coil pattern 200a is a starting point, the coil pattern 200a extends around the one end 2.5 times in the clockwise direction and subsequently bends toward the negative side in the Y-axis direction to reach the other end. Similarly, assuming that the one end of the coil pattern 200b is a starting point, the coil pattern 200b extends around the one end 2.5 times in the anticlockwise direction and subsequently bends toward the negative side in the Y-axis direction to reach the other end. The one end of the coil pattern 200a is connected to the one end of the coil pattern 200c by the interlayer connection conductor 240a extending in the Z-axis direction, and the one end of the coil pattern 200b is connected to the other end of the coil pattern 200c by the interlayer connection conductor 240b extending in the Z-axis direction.

In the planar view of the insulation layers 120b and 120c, a section of the coil pattern 200a overlaps with a section of the coil pattern 200c, and a section of the coil pattern 200b overlaps with another section of the coil pattern 200c. The power feeding circuit 180 includes the coil patterns 200a to 200c arranged in this way as well as the interlayer connection conductors 240a and 240b.

In the third preferred embodiment, between the overlapping sections of the coil patterns 200a and 200c, the section of the coil pattern 200a is defined as a "first coil portion CIL1" and the section of the coil pattern 200c is defined as a "third coil portion CIL3." Between the overlapping sections of the coil patterns 200b and 200c, the section of the coil pattern 200b is defined as a "second coil portion CIL2" and the section of the coil pattern 200c is defined as a "fourth coil portion CIL4." The position of the one end of the coil pattern 200a or the one end of the coil pattern 200c is defined as a "first position P1" and the position of the one end of the coil pattern 200b or the other end of the coil pattern 200c is defined as a "second position P2."

Rectangular or substantially rectangular dummy conductors 260a and 260b made of flexible copper foil are also formed on the one principal surface of the insulation layer 120c. In the planar view of the insulation layers 120b and 120c, the dummy conductors 260a and 260b are disposed to overlap with two respective corners arranged in the X-axis direction on the negative side in the Y-axis direction out of the four corners of the rectangle drawn by the through-hole HL1.

The RFIC chip 160 is mounted on the insulation layer 120c such that the four corners of the other principal surface respectively face the first coil end T1, the second coil end T2, and the dummy conductors 260a, 260b. The first input/output terminal 160a is disposed on the other principal surface of the RFIC chip 160 to overlap with the first coil end T1 in the planar view. Similarly, the second input/output terminal 160b is disposed on the other principal surface of the RFIC chip 160 to overlap with the second coil end T2 in the planar view.

As a result, the RFIC chip 160 is connected to the first coil end T1 by the first input/output terminal 160a and is connected to the second coil end T2 by the second input/output terminal 160b.

Figure 16:
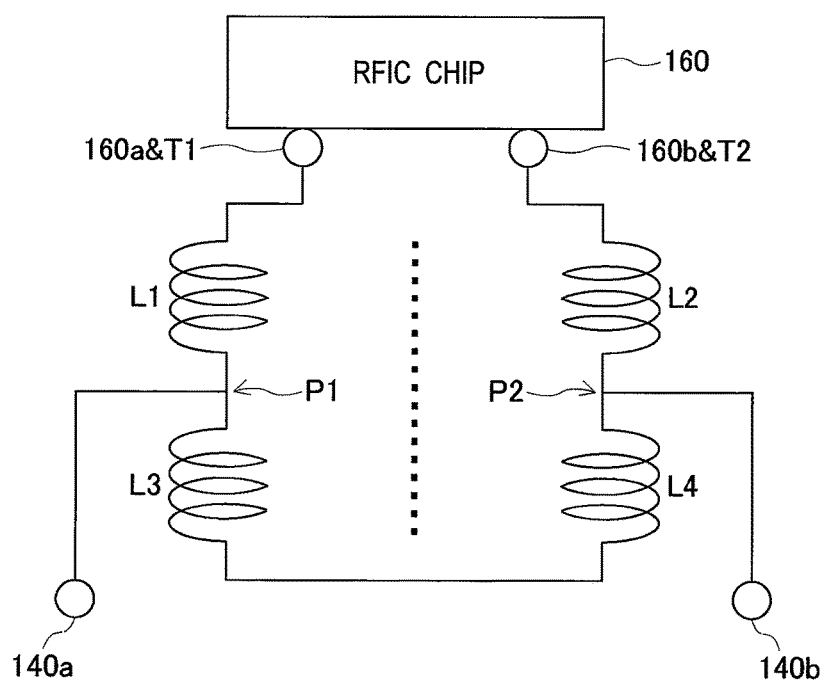
FIG. 16 is a circuit diagram of an equivalent circuit of the RFIC element shown in FIG. 15.
Figure 17A:
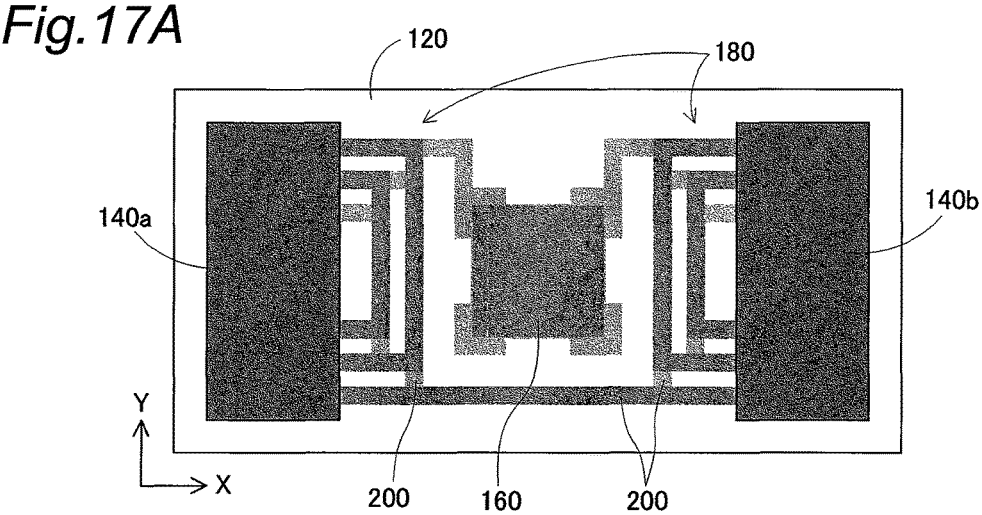
FIG. 17A is a top view of the RFIC element shown in FIG. 15 viewed from directly above.
Figure 17B:
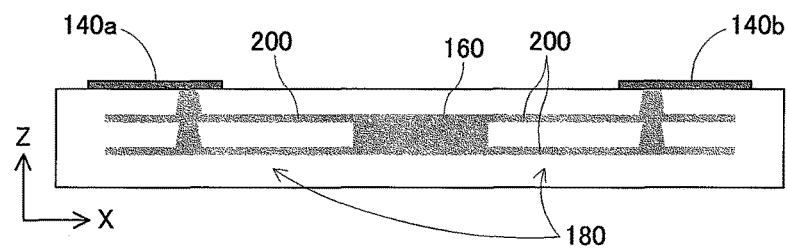
FIG. 17B is a side view of the RFIC element shown in FIG. 15 viewed from the side.
Figure 17C:
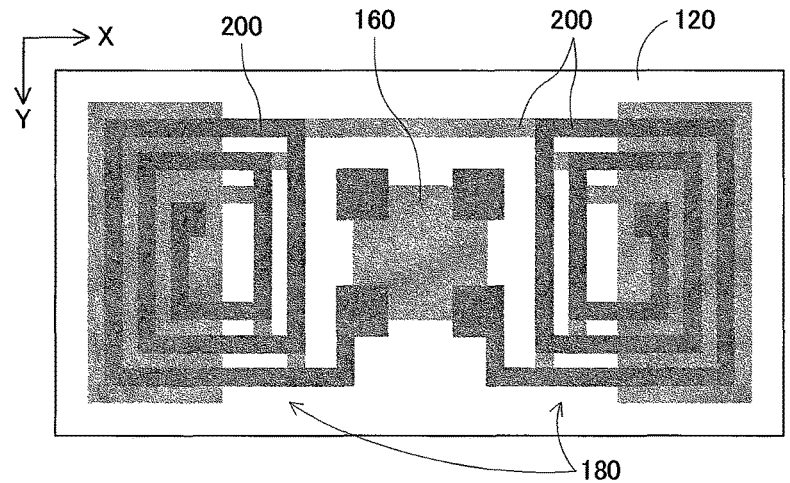
FIG. 17C is a bottom view of the RFIC element shown in FIG. 15 viewed from directly below.

An equivalent circuit of the RFIC element 100 configured in this way is shown in FIG. 16. An inductor L1 corresponds to the first coil portion CIL1, and an inductor L2 corresponds to the second coil portion CIL2. An inductor L3 corresponds to the third coil portion CIL3, and an inductor L4 corresponds to the fourth coil portion CIL4. The characteristics of impedance matching by the power feeding circuit 180 are specified by the values of the inductors L1 to L4.

One end of the inductor L1 and one end of the inductor L2 are connected to the first input/output terminal 160a and the second input/output terminal 160b, respectively, disposed on the RFIC chip 160. The other end of the inductor L1 is connected to one end of the inductor L3, and the other end of the inductor L2 is connected to one end of the inductor L4. The other end of the inductor L3 is connected to the other end of the inductor L4. The first terminal electrode 140a is connected to a connection point between the inductors L1 and L3, and the second terminal electrode 140b is connected to a connection point between the inductors L2 and L4.

Figure 20:
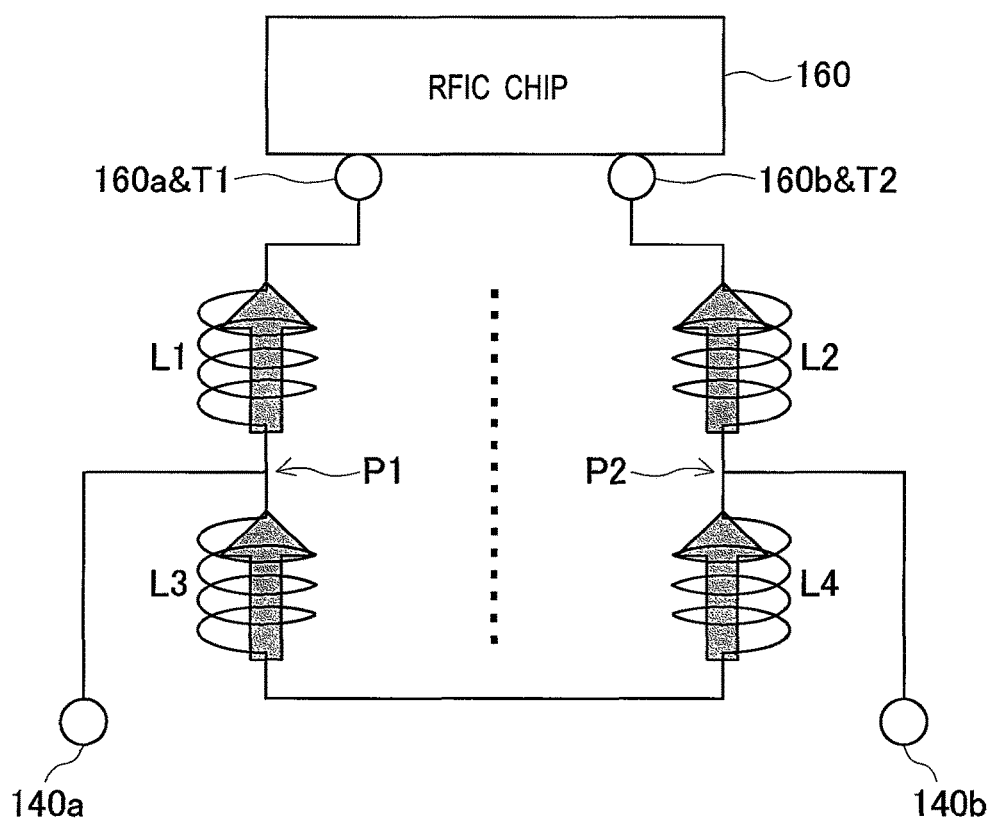
FIG. 20 is a schematic of an example of a state of a magnetic field occurring on the equivalent circuit.

As can be seen from this equivalent circuit, the first coil portion CIL1, the second coil portion CIL2, the third coil portion CIL3, and the fourth coil portion CIL4 are wound to provide magnetic fields in phase and are connected in series to each other. Therefore, the magnetic fields are generated toward a direction indicted by arrows of FIG. 20 at a certain time point and are generated toward a direction opposite to the arrows at another time point.

Figure 18A:
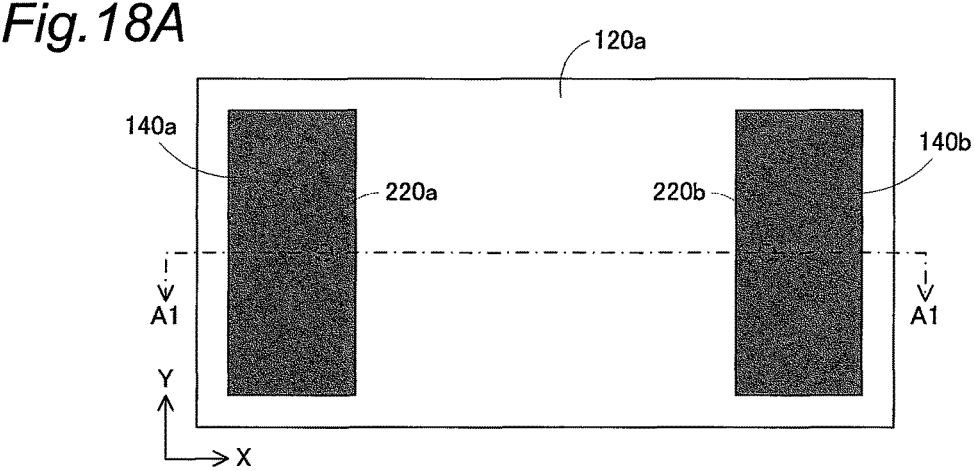
FIG. 18A is a top view of an upper insulation layer of a multilayer substrate of the RFIC element shown in FIG. 15 viewed from directly above.
Figure 18B:
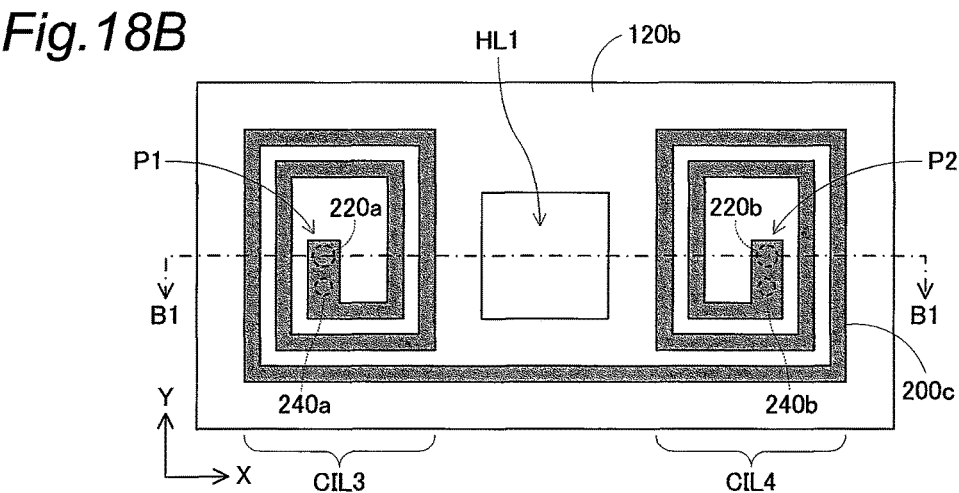
FIG. 18B is a top view of an intermediate insulation layer of the multilayer substrate of the RFIC element shown in FIG. 15 viewed from directly above.
Figure 18C:
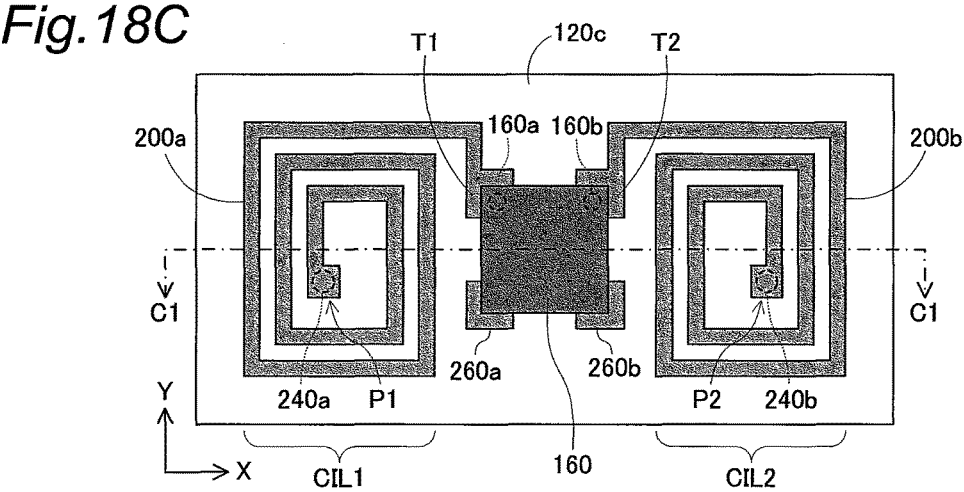
FIG. 18C is a top view of a lower insulation layer of the multilayer substrate of the RFIC element shown in FIG. 15 viewed from directly below.
Figure 19A:
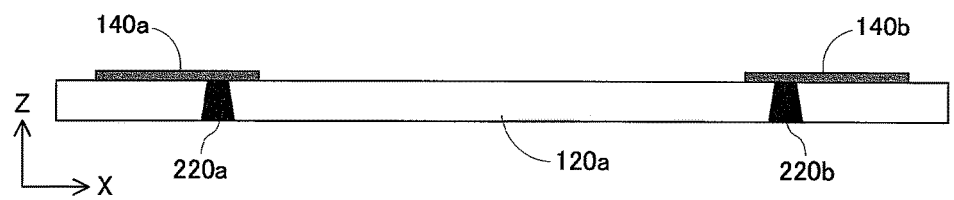
FIG. 19A is a cross-sectional view of the insulation layer shown in FIG. 18A taken along a cross section A1-A1.
Figure 19B:
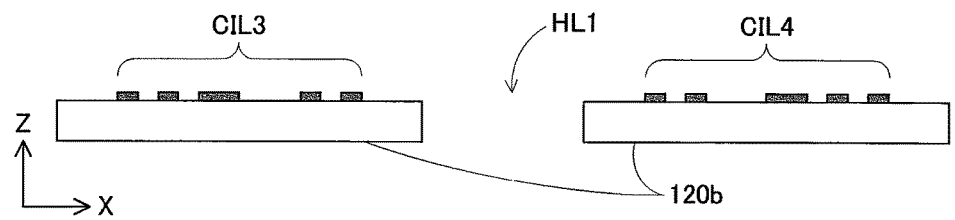
FIG. 19B is a cross-sectional view of the insulation layer shown in FIG. 18B taken along a cross section B1-B1.
Figure 19C:
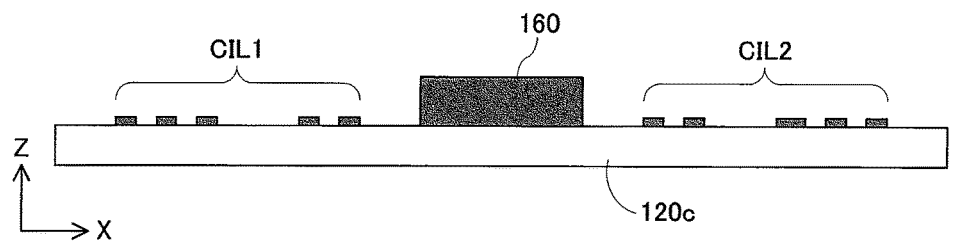
FIG. 19C is a cross-sectional view of the insulation layer shown in FIG. 18C taken along a cross section C1-C1.

As can be seen from FIGS. 18B and 18C, the first coil portion CIL1 and the third coil portion CIL3 have the same or substantially the same loop shape and a same first winding axis, and the second coil portion CIL2 and the fourth coil portion CIL4 have the same or substantially the same loop shape and a same second winding axis. The first winding axis and the second winding axis are disposed at positions where the RFIC chip 160 is interposed therebetween.

Therefore, the first coil portion CIL1 and the third coil portion CIL3 are magnetically and capacitively coupled, while the second coil portion CIL2 and the fourth coil portion CIL4 are magnetically and capacitively coupled.

As can be understood from the description, the RFIC chip 160 includes the first input/output terminal 160a and the second input/output terminal 160b and is built into the multilayer substrate 120. The power feeding circuit 180 includes the coil patterns 200a to 200c and is built into the multilayer substrate 120. Among these, the coil pattern 200a has the other end (the first coil end T1) connected to the first input/output terminal 160a, and the coil pattern 200b has the other end (the second coil end T2) connected to the second input/output terminal 160b. The first terminal electrode 140a and the second terminal electrode 140b are disposed on the one principal surface of the multilayer substrate 120 and are connected to the one end of the coil pattern 200a (the first position P1) and the one end of the coil pattern 200b (the second position P2), respectively.

The first coil portion CIL1 is present in a section extending from the first coil end T1 to the first position P1 and has the first winding axis in the direction intersecting with the one principal surface of the multilayer substrate 120. The second coil portion CIL2 is present in a section extending from the second coil end T2 to the second position P2 and has the second winding axis in the direction intersecting with the one principal surface of the multilayer substrate 120. The third coil portion CIL3 is disposed to overlap with the first coil portion CIL1 in the planar view and the fourth coil portion CIL4 is disposed to overlap with the second coil portion CIL2 in the planar view. The first coil portion CIL1/the third coil portion CIL3 and the second coil portion CIL2/the fourth coil portion CIL4 are disposed at positions where the RFIC chip 160 is interposed therebetween in the planar view of the multilayer substrate 120.

While the power feeding circuit 180 that provides impedance matching is built into the multilayer substrate 120, the RFIC chip 160 is also built into the multilayer substrate 120, and the first coil portion CIL1/the third coil portion CIL3 and the second coil portion CIL2/the fourth coil portion CIL4 are disposed at positions where the RFIC chip 160 is interposed therebetween in the planar view of the multilayer substrate 120.

Since the RFIC chip 160 includes the semiconductor substrate, the RFIC chip 160 defines and functions as a ground or a shield for the first coil portion CIL1, the second coil portion CIL2, the third coil portion CIL3, and the fourth coil portion CIL4, so that the first coil portion CIL1 and the second coil portion CIL2 are hardly magnetically or capacitively coupled to each other while the third coil portion CIL3 and the fourth coil portion CIL4 are hardly magnetically or capacitively coupled to each other. This enables the reduction in the risk of narrowing the passband of communication signals.

An example of an RFID tag including the RFIC element 100 of the third preferred embodiment mounted thereon is shown in FIGS. 21A and 21B. This RFID tag is a dipole type RFID tag, and a radiation element 300a includes a radiation conductor base material 320a and radiation conductors 340a, 340b disposed thereon.

The radiation conductor base material 320a is a belt-shaped flexible base material made of PET. Each of the radiation conductors 340a and 340b is a belt-shaped flexible conductor made of aluminum foil or copper foil. The radiation conductors 340a and 340b have common widths and lengths. The width of each of the radiation conductors 340a and 340b is smaller than the width of the radiation conductor base material 320a, and the length of each of the radiation conductors 340a and 340b is less than a half of the length of the radiation conductor base material 320a.

The radiation conductors 340a and 340b are disposed on a surface of the radiation conductor base material 320a (a surface facing toward the negative side in the Z-axis direction). Specifically, the radiation conductor 340a is disposed on a region of the surface of the radiation conductor base material 320a on the negative side in the X-axis direction in a posture extending in the longitudinal direction of the radiation conductor base material 320a. Similarly, the radiation conductor 340b is disposed on a region of the surface of the radiation conductor base material 320a on the positive side in the X-axis direction in a posture extending in the longitudinal direction of the radiation conductor base material 320a.

An interval between one end of the radiation conductor 340a (an end portion on the positive side in the X-axis direction) and one end of the radiation conductor 340b (an end portion on the negative side in the X-axis direction) is matched to an interval between the first terminal electrode 140a and the second terminal electrode 140b disposed on the RFIC element 100.

The RFIC element 100 is mounted on the surface of the radiation conductor base material 320a at a center position in a posture with one principal surface thereof facing the surface of the radiation conductor base material 320a. As a result, the first terminal electrode 140a is connected to the one end of the radiation conductor 340a, and the second terminal electrode 140b is connected to the one end of the radiation conductor 340b.

Figure 23:
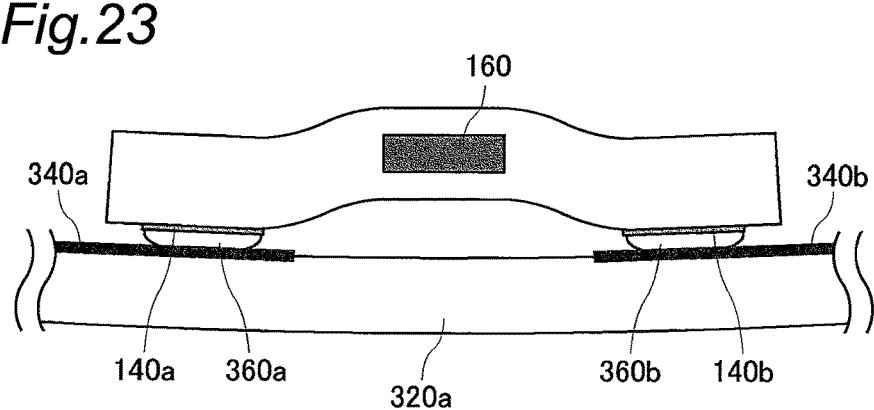
FIG. 23 is a schematic of a bent state of an RFIC element mounted on a radiation element.

The first terminal electrode 140a is fixed to the radiation conductor 340a by a conductive bonding material 360a, and the second terminal electrode 140b is fixed to the radiation conductor 340b by a conductive bonding material 360b (see FIG. 23). Instead of the conductive bonding materials 360a and 360b, an insulation bonding material may be used for capacitive connection. In short, the first terminal electrode 140a and the second terminal electrode 140b may be electrically connected to the radiation conductors 340a and 340b.

As described above, the multilayer substrate 120 is made of flexible polyimide or liquid crystal polymer, and the coil patterns 200a to 200c, the first terminal electrode 140a, and the second terminal electrode 140b are made of flexible copper foil. On the other hand, the interlayer connection conductors 220a, 220b, 240a, 240b are hard conductors made of Sn, and the substrate of the RFIC chip 160 is also a hard substrate made of silicon. The first and second terminal electrodes 140a, 140b including a large area make the flexibility of the copper foil smaller and, moreover, the flexibility is lost by applying a plating film of Ni/Au or Ni/Sn etc.

Figure 22:
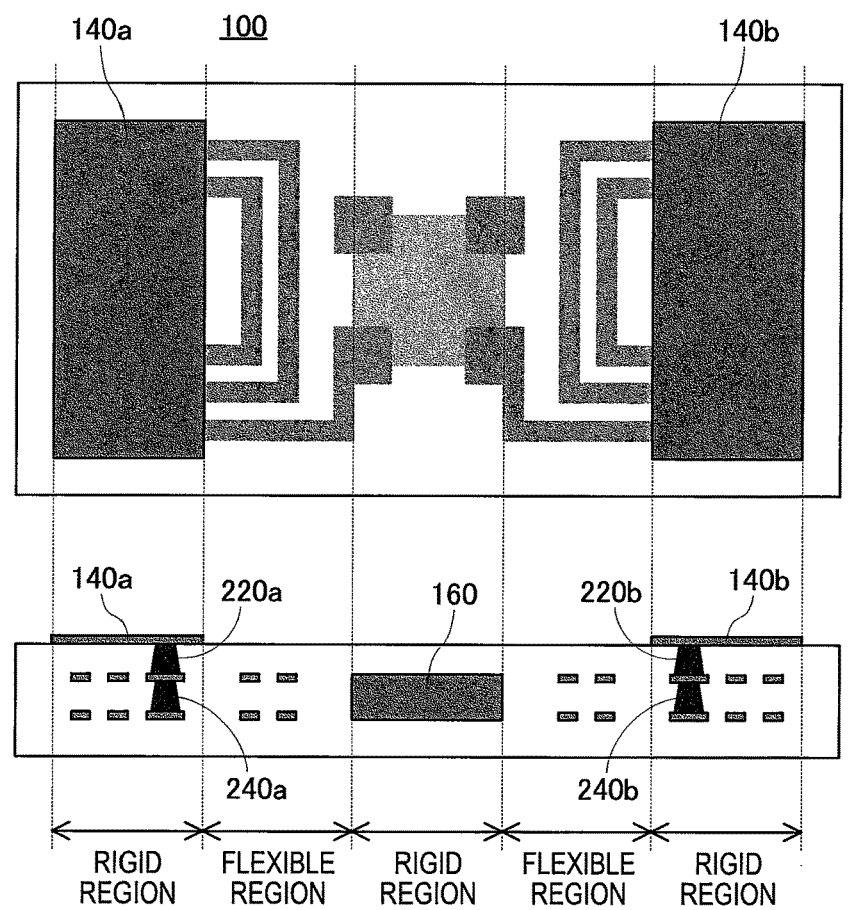
FIG. 22 is a schematic of a distribution state of rigid and flexible regions in the RFIC element shown in FIG. 15.

As a result, rigid regions and flexible regions are provided in the RFIC element 100 as shown in FIG. 22. According to FIG. 22, the respective regions disposed with the first terminal electrode 140a, the second terminal electrode 140b, and the RFIC chip 160 are defined as the rigid regions, and the other regions are defined as the flexible regions. Particularly, since the first terminal electrode 140a and the second terminal electrode 140b are each disposed at a position spaced away from the RFIC chip 160 in a planar view, the flexible regions are provided between the first terminal electrode 140a and the RFIC chip 160 and between the second terminal electrode 140b and the RFIC chip 160. The interlayer connection conductors 220a, 220b, 240a, 240b are disposed in the rigid regions.

Therefore, when the RFID tag is affixed to a curved surface, the RFIC element 100 is bent as shown in FIG. 23, for example.

Figure 24:
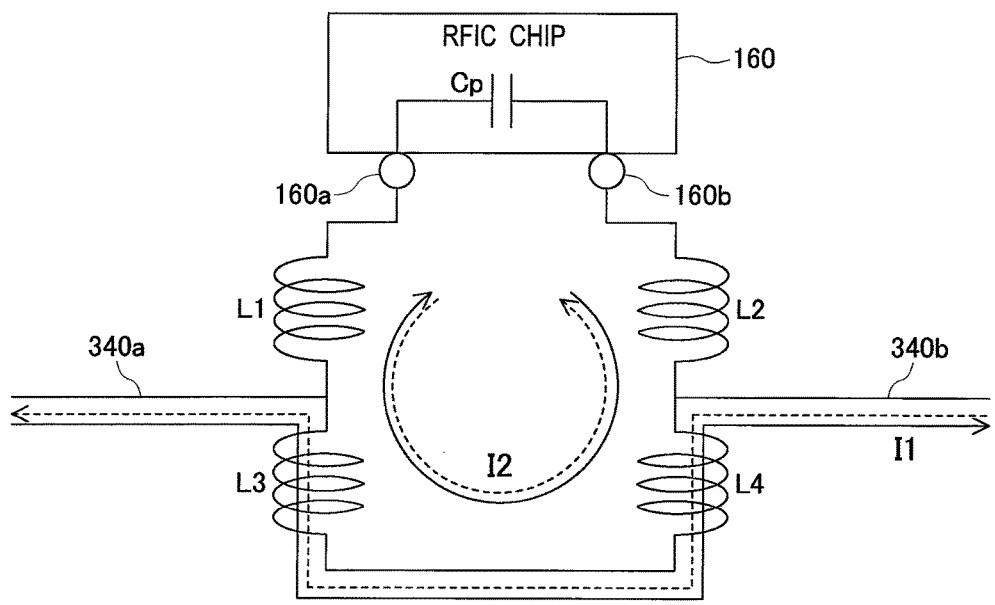
FIG. 24 is a schematic of an example of a state of a current flowing through the equivalent circuit.

Referring to FIG. 24, the RFIC chip 160 itself has a parasitic capacitance (stray capacitance) Cp present between the first input/output terminal 160a and the second input/output terminal 160b, and two resonances are generated in the RFIC element 100. The first resonance is the resonance generated in a current path including the radiation conductors 340a, 340b, the inductor L3, and the inductor L4, and the second resonance is the resonance generated in a current path (current loop) including the inductors L1 to L4 and the parasitic capacitance Cp. These two resonances are coupled by the inductors L3 to L4 shared by the current paths, and two respective currents I1 and I2 corresponding to the two resonances flow in a manner as shown in FIG. 24.

Figure 25:
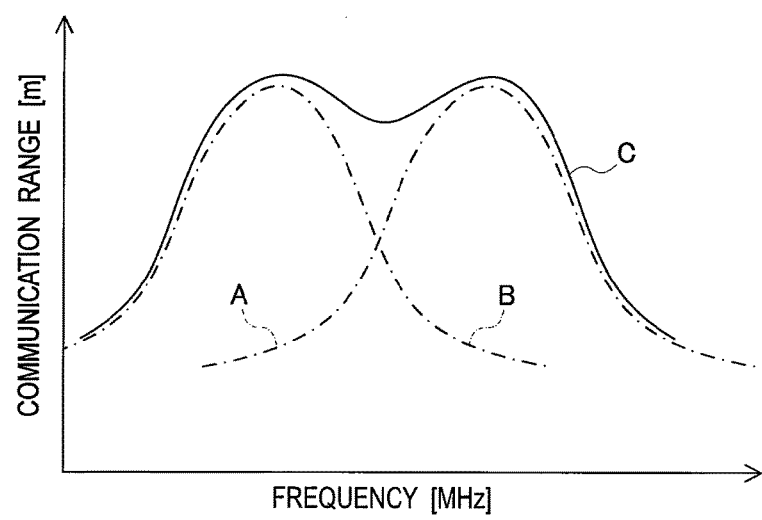
FIG. 25 is a graph of an example of frequency characteristics of an RFID tag.

Both a first resonance frequency and a second resonance frequency are affected by the inductors L3 to L4. A difference of several dozen MHz (specifically, about 5 MHz to about 50 MHz, for example) is generated between the first resonance frequency and the second resonance frequency. The resonance frequency characteristics thereof are represented by curves A and B in FIG. 25. By combining the two resonances including such resonance frequencies, broadband resonance frequency characteristics are produced as indicated by a curve C in FIG. 25.

The configurations of the first to third preferred embodiments and the modification examples thereof can obviously be combined as needed without contradiction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wireless communication device comprising:
   a radiation conductor base material including a radiation conductor and including a principal surface;
   a radio frequency integrated circuit (RFIC) element including a principal surface on which a terminal electrode is provided; and
   a seal including an adhesive surface on a flexible seal base material; wherein
   the RFIC element is disposed on the principal surface of the radiation conductor base material such that the terminal electrode directly or indirectly contacts with a portion of the radiation conductor;
   the seal is affixed with the adhesive surface to the radiation conductor base material to cover at least a portion of the RFIC element so as to fix the RFIC element to the radiation conductor base material.

2. The wireless communication device according to claim 1, wherein the seal includes a protective material disposed on a principal surface of the flexible seal base material and is affixed to the radiation conductor base material such that the protective material overlaps with the terminal electrode in a planar view.

3. The wireless communication device according to claim 2, wherein
   the portion of the radiation conductor includes a first slit; and
   the protective material of the seal includes a second slit and is affixed to the radiation conductor base material such that the second slit overlaps with the first slit in a planar view.

4. The wireless communication device according to claim 1, wherein
   the adhesive surface includes a first adhesive surface and a second adhesive surface surrounding the first adhesive surface; and
   the first adhesive surface and the second adhesive surface adhere to the RFIC element and the radiation conductor base material, respectively.

5. The wireless communication device according to claim 1, wherein the radiation conductor base material, the RFIC element, and the seal are flexible.

6. The wireless communication device according to claim 1, wherein
   the RFIC element includes an RFIC chip that processes a high-frequency signal, a power feeding circuit including a resonance frequency corresponding to a communication frequency, and a substrate including the RFIC chip mounted thereon and the power feeding circuit built therein; and
   the terminal electrode is provided on a principal surface of the substrate and connected through the power feeding circuit to the RFIC chip.

7. The wireless communication device according to claim 1, wherein the RFIC element includes a flexible base material, the terminal electrode and an RFIC chip are mounted on the flexible base material, and the RFIC chip ant the terminal electrode do not overlap with each other in a planar view.

8. The wireless communication device according to claim 7, wherein the terminal electrode projects from a surface of the flexible base material.

9. A seal fitted with radio frequency integrated circuit (RFIC) element comprising:
   an RFIC element including a principal surface on which a terminal electrode is provided; and
   a seal including an adhesive surface on a flexible seal base material; wherein
   the seal fitted with an RFIC element is defined by the RFIC element fixed to a partial region of the adhesive surface such that the terminal electrode is exposed;
   another partial region of the adhesive surface is a region adhering to a radiation conductor base material such that the terminal electrode directly or indirectly contacts with a principal surface of the radiation conductor base material.

10. The seal fitted with an RFIC element according to claim 9, further comprising a protective material disposed on a principal surface of the flexible seal base material and affixed to the radiation conductor base material such that the protective material overlaps with the terminal electrode in a planar view.

11. The seal fitted with an RFIC element according to claim 10, wherein
   a portion of the radiation conductor includes a first slit; and
   the protective material of the seal includes a second slit and is affixed to the radiation conductor base material such that the second slit overlaps with the first slit in a planar view.

12. The seal fitted with an RFIC element according to claim 9, wherein
   the adhesive surface includes a first adhesive surface and a second adhesive surface surrounding the first adhesive surface; and
   the first adhesive surface and the second adhesive surface adhere to the RFIC element and the radiation conductor base material, respectively.

13. The seal fitted with an RFIC element according to claim 9, wherein the radiation conductor base material, the RFIC element, and the seal are flexible.

14. The seal fitted with an RFIC element according to claim 9, wherein
   the RFIC element includes an RFIC chip that processes a high-frequency signal, a power feeding circuit including a resonance frequency corresponding to a communication frequency, and a substrate including the RFIC chip mounted thereon and the power feeding circuit built therein; and
   the terminal electrode is provided on a principal surface of the substrate and connected through the power feeding circuit to the RFIC chip.

15. A method for manufacturing a wireless communication device comprising:
   a preparing step of preparing a radiation conductor base material including a radiation conductor and including a principal surface, radio frequency integrated circuit (RFIC) element including a principal surface on which a terminal electrode is provided, and a seal including an adhesive surface on a flexible seal base material;
   a first affixing step of producing a seal fitted with an RFIC element by affixing the RFIC element to a partial region of the adhesive surface of the seal such that the terminal electrode is exposed; and
   a second affixing step of affixing another partial region of the adhesive surface of the seal fitted with an RFIC element to the principal surface of the radiation conductor base material such that the terminal electrode directly or indirectly contacts with a portion of the radiation conductor.

16. The method according to claim 15, further comprising forming a protective material on a principal surface of the flexible seal base material and affixed to the radiation conductor base material such that the protective material overlaps with the terminal electrode in a planar view.

17. The method according to claim 16, wherein
   the portion of the radiation conductor includes a first slit; and
   the protective material of the seal includes a second slit and is affixed to the radiation conductor base material such that the second slit overlaps with the first slit in a planar view.

18. The method according to claim 15, wherein
   the adhesive surface includes a first adhesive surface and a second adhesive surface surrounding the first adhesive surface; and
   the first adhesive surface and the second adhesive surface adhere to the RFIC element and the radiation conductor base material, respectively.

19. A method for manufacturing a wireless communication device by using a seal fitted with radio frequency integrated circuit (RFIC) element including an RFIC element including a principal surface on which a terminal electrode is provided, and a seal including an adhesive surface on a flexible seal base material, the seal being fitted with an RFIC element being formed by affixing the RFIC element to the adhesive surface such that the terminal electrode is exposed, the method comprising:
   a preparing step of preparing a radiation conductor base material including a radiation conductor and including a principal surface; and
   an affixing step of affixing the seal fitted with an RFIC element to the principal surface of the radiation conductor base material such that the terminal electrode directly or indirectly contacts with a portion of the radiation conductor.

20. A method for producing a seal fitted with radio frequency integrated circuit (RFIC) element comprising:
   a preparing step of preparing an RFIC element including a principal surface on which a terminal electrode is provided and a seal including an adhesive surface on a flexible seal base material; and
   an affixing step of affixing the RFIC element to the adhesive surface of the seal such that the terminal electrode is exposed; wherein
   the seal fitted with an RFIC element is a member affixed to a radiation conductor base material such that the terminal electrode directly or indirectly contacts with a principal surface of the radiation conductor base material.

* * * * *